US012471890B2

(12) United States Patent
Tashiro

(10) Patent No.: US 12,471,890 B2
(45) Date of Patent: Nov. 18, 2025

(54) ULTRASOUND SYSTEM AND CONTROL METHOD OF ULTRASOUND SYSTEM

(71) Applicant: FUJIFILM Corporation, Tokyo (JP)

(72) Inventor: Rika Tashiro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 18/535,396

(22) Filed: Dec. 11, 2023

(65) Prior Publication Data

US 2024/0099701 A1   Mar. 28, 2024

Related U.S. Application Data

(63) Continuation of application No. PCT/JP2022/022958, filed on Jun. 7, 2022.

(30) Foreign Application Priority Data

Jun. 14, 2021   (JP) ................................. 2021-098712

(51) Int. Cl.
*A61B 8/00*   (2006.01)

(52) U.S. Cl.
CPC ............... *A61B 8/54* (2013.01); *A61B 8/465* (2013.01); *A61B 8/5207* (2013.01); *A61B 8/565* (2013.01)

(58) Field of Classification Search
CPC ......... A61B 8/54; A61B 8/465; A61B 8/5207; A61B 8/565
See application file for complete search history.

(56) References Cited

U.S. PATENT DOCUMENTS

| 5,840,018 | A  | * | 11/1998 | Michaeli | A61B 8/0816 |
|           |    |   |         |          | 600/300     |
| 6,063,030 | A  | * | 5/2000  | Vara     | A61B 8/465  |
|           |    |   |         |          | 600/440     |
| 6,261,234 | B1 | * | 7/2001  | Lin      | A61B 8/445  |
|           |    |   |         |          | 600/463     |
| 6,468,212 | B1 | * | 10/2002 | Scott    | A61B 8/463  |
|           |    |   |         |          | 600/440     |

(Continued)

FOREIGN PATENT DOCUMENTS

| JP | 2010110366 A | 5/2010 |
| JP | 2011019588 A | 2/2011 |

(Continued)

OTHER PUBLICATIONS

International Preliminary Report on Patentability (Chapter I) and Written Opinion of the International Searching Authority issued in PCT/JP2022/022958; issued Dec. 14, 2023.

(Continued)

*Primary Examiner* — Sanjay Cattungal
(74) *Attorney, Agent, or Firm* — Studebaker Brackett PLLC

(57) ABSTRACT

In an ultrasound system and a control method of the ultrasound system according to the embodiment of the present invention, a ticket acquisition unit acquires an electronic ticket including information on an upper limit time for scanning an examination site using an ultrasound probe, and a scanning control unit controls a scanning time from start to end of the scanning to be limited to the upper limit time included in the electronic ticket. Accordingly, a patient can scan the examination site safely at home or the like.

20 Claims, 13 Drawing Sheets

(56) References Cited

U.S. PATENT DOCUMENTS

| | | | |
|---|---|---|---|
| 9,072,471 B2* | 7/2015 | Kato | A61B 8/462 |
| 9,402,601 B1* | 8/2016 | Berger | G16H 40/67 |
| 2003/0179915 A1* | 9/2003 | Goto | G06T 7/12 |
| | | | 382/128 |
| 2003/0195418 A1* | 10/2003 | Barnes | A61B 8/462 |
| | | | 600/437 |
| 2004/0120561 A1* | 6/2004 | Goto | G06T 7/0012 |
| | | | 382/128 |
| 2005/0085730 A1* | 4/2005 | Flesch | A61B 8/12 |
| | | | 600/459 |
| 2006/0020204 A1* | 1/2006 | Serra | G01S 7/5208 |
| | | | 600/437 |
| 2007/0253531 A1* | 11/2007 | Okuzawa | G06T 5/40 |
| | | | 378/62 |
| 2010/0160787 A1* | 6/2010 | Gorzitze | A61M 5/427 |
| | | | 600/461 |
| 2010/0217128 A1* | 8/2010 | Betts | A61B 8/4254 |
| | | | 345/184 |
| 2011/0301464 A1 | 12/2011 | Yoo et al. | |
| 2012/0133601 A1* | 5/2012 | Marshall | G06F 3/041 |
| | | | 345/173 |
| 2012/0183188 A1* | 7/2012 | Moriya | G16H 30/20 |
| | | | 382/128 |
| 2013/0120524 A1* | 5/2013 | Zheng | H04N 5/265 |
| | | | 348/36 |
| 2013/0226001 A1* | 8/2013 | Steen | G01S 7/52096 |
| | | | 600/447 |
| 2013/0239052 A1* | 9/2013 | Moody | G06F 3/017 |
| | | | 715/810 |
| 2013/0324850 A1* | 12/2013 | Petruzzelli | A61B 8/465 |
| | | | 600/407 |
| 2014/0051984 A1* | 2/2014 | Berger | A61B 18/02 |
| | | | 600/424 |
| 2014/0121524 A1* | 5/2014 | Chiang | A61B 8/0891 |
| | | | 600/459 |
| 2014/0243669 A1* | 8/2014 | Halmann | G01S 7/5208 |
| | | | 600/443 |
| 2015/0265252 A1* | 9/2015 | Chu | A61B 8/461 |
| | | | 600/431 |
| 2017/0150948 A1* | 6/2017 | Kanayama | A61B 8/488 |
| 2018/0014811 A1 | 1/2018 | Sonnenschein | |
| 2019/0005662 A1* | 1/2019 | Hirakawa | G06T 7/73 |
| 2020/0245968 A1 | 8/2020 | Nellur Prakash et al. | |
| 2021/0350906 A1* | 11/2021 | Janicki | G06F 3/0483 |
| 2023/0132148 A1* | 4/2023 | Sowards | A61B 8/0841 |
| | | | 600/437 |
| 2023/0138970 A1* | 5/2023 | Sowards | A61B 8/0841 |
| | | | 600/437 |

FOREIGN PATENT DOCUMENTS

| | | |
|---|---|---|
| JP | 2014094245 A | 5/2014 |
| JP | 2018504185 A | 2/2018 |
| JP | 2020536666 A | 12/2020 |

OTHER PUBLICATIONS

International Search Report issued in PCT/JP2022/022958; mailed Aug. 30, 2022.

* cited by examiner

ULTRASOUND SYSTEM AND CONTROL METHOD OF ULTRASOUND SYSTEM

CROSS-REFERENCE TO RELATED APPLICATIONS

This application is a Continuation of PCT International Application No. PCT/JP2022/022958 filed on Jun. 7, 2022, which claims priority under 35 U.S.C. § 119(a) to Japanese Patent Application No. 2021-098712 filed on Jun. 14, 2021. The above applications are hereby expressly incorporated by reference, in their entirety, into the present application.

BACKGROUND OF THE INVENTION

1. Field of the Invention

The present invention relates to an ultrasound system and a control method of the ultrasound system which have a function of controlling an implementation period, a scanning time, and the like in a case in which a patient scans an examination site at home or the like.

2. Description of the Related Art

In the related art, a doctor has performed diagnosis or the like based on an ultrasound image by scanning an examination site of a patient, who is a subject using an ultrasound diagnostic apparatus.

On the other hand, a handheld ultrasound diagnostic apparatus is inexpensive as compared with the stationary and portable ultrasound diagnostic apparatuses and is easily carried, and thus self-echo that allows a patient to scan an examination site by using a handheld ultrasound diagnostic apparatus at home or the like is required in the recent years as described in JP2014-094245A, JP2018-504185A, and JP2020-536666A.

JP2014-094245A describes that in a case in which the follow-up observation of fetal growth is continuously performed using an ultrasound diagnostic apparatus applicable to home medical care, a subject (pregnant woman), which is an operator of the ultrasound diagnostic apparatus, uses an ultrasound probe to collect image data of an examination target region including a fetus.

JP2018-504185A describes an ultrasound system including a smart apparatus, a substrate having an ultrasound array and connected to the smart apparatus, and a communication component that allows bidirectional communication between the system and an external apparatus, and also describes that, in the ultrasound system for a doctor to monitor the internal organs of a pregnant patient at home from the doctor's office, the doctor or patient using the system transmits images or videos to the medical center or the doctor's computer.

JP2020-536666A describes an ultrasound image system in which a user performs ultrasound scanning of an ovary at the user's home, generates an ultrasound image including a follicle, and transmits the ultrasound image to a remote receiver of the doctor located at a remote location.

SUMMARY OF THE INVENTION

However, in general, an ultrasound diagnostic apparatus used in a medical field is a medical device that is premised to be used by doctors who are familiar with the ultrasound diagnostic technique, and patients are not familiar with the ultrasound diagnostic technique and the use of ultrasound diagnostic apparatus.

In addition, it has been explained to patients that examinations using ultrasound, unlike examinations that use radiation such as chest X-rays, do not involve the risk of exposure to radiation, that examinations can be performed repeatedly and are safe. However, according to the medical societies or the like, it is required to confirm the safety of the ultrasound examination before use, such as not irradiating patients with ultrasound in a case in which it is unnecessary and by confirming the safety of the ultrasound examination in fetuses that are susceptible to external stimuli.

In this way, in a case in which the patient can freely perform scanning at home or the like with the patient's own determination without receiving a direct instruction from a doctor, there is a risk that the ultrasound is applied to the patient at an unnecessary time, which may lead to health hazards for the patient.

JP2014-094245A, JP2018-504185A, and JP2020-536666A do not disclose any problems related to safety associated with the use by a patient who is not familiar with the ultrasound diagnostic technique and the use of the ultrasound diagnostic apparatus.

Therefore, an object of the present invention is to provide an ultrasound system and a control method of the ultrasound system that enable a patient to safely scan an examination site at home or the like.

In order to achieve the above-described object, according to the present invention, there is provided an ultrasound system in which an ultrasound diagnostic apparatus used by a patient and an external control apparatus used by a doctor are connected to each other via a network, in which the ultrasound diagnostic apparatus includes an ultrasound probe and a diagnostic apparatus main body, and the diagnostic apparatus main body includes a ticket acquisition unit that acquires an electronic ticket including information on an upper limit time for scanning an examination site using the ultrasound probe, and a scanning control unit that controls a scanning time from start to end of the scanning to be limited to the upper limit time included in the electronic ticket.

Here, it is preferable that the diagnostic apparatus main body includes an ultrasound image generation unit that generates an ultrasound image from a signal obtained by the scanning, and a diagnosis-side communication unit that transmits the ultrasound image from the ultrasound diagnostic apparatus to the external control apparatus according to an instruction from the patient, the external control apparatus includes a control apparatus main body and a control-side monitor, and the control apparatus main body includes a control-side communication unit that receives the ultrasound image transmitted from the ultrasound diagnostic apparatus, and a control-side display control unit that displays the ultrasound image received by the control-side communication unit on the control-side monitor.

In addition, it is preferable that the control apparatus main body includes a ticket number detection unit that detects the number of the electronic tickets held by the patient, and a ticket distribution control unit that controls whether or not to distribute the electronic ticket from the external control apparatus based on information on the number of the electronic tickets.

In addition, it is preferable that the scanning control unit performs control such that the scanning is capable of being started in a case in which a precondition is satisfied that the ultrasound probe and the diagnostic apparatus main body are connected, the diagnostic apparatus main body is connected to the network, and the scanning time is controlled based on date and time information acquired from the network, and the patient has the electronic ticket, and the diagnostic apparatus main body includes a notification unit that notifies the patient of an error message in at least one of a case in which the precondition is not satisfied or a case in which the patient does not have the electronic ticket.

In addition, it is preferable that the diagnostic apparatus main body includes a diagnosis-side monitor, and a diagnosis-side display control unit that displays a menu screen including a plurality of icons corresponding to a plurality of functions included in an application for ultrasound diagnosis on the diagnosis-side monitor, and that switches the icon corresponding to a function of scanning from an active state to an inactive state in at least one of the case in which the precondition is not satisfied or the case in which the patient does not have the electronic ticket.

In addition, it is preferable that the notification unit notifies the patient of an error message in a case in which the patient selects the icon corresponding to the function of the scanning in the inactive state.

In addition, it is preferable that the scanning control unit forcibly ends the scanning in a case in which the scanning time reaches the upper limit time, and in a case in which the scanning is forcibly ended, the notification unit notifies the doctor that the scanning has been forcibly ended.

In addition, it is preferable that the control apparatus main body includes a control-side ticket generation unit that generates the electronic ticket according to an instruction from the doctor.

In addition, it is preferable that, in a case in which symptoms of the patient progress along a plurality of stages, the control-side ticket generation unit sets a default value of the upper limit time for each stage.

In addition, it is preferable that the control-side ticket generation unit changes the default value of the upper limit time according to the instruction from the doctor.

In addition, it is preferable that a server that is connected to the ultrasound diagnostic apparatus and the external control apparatus via the network is provided, the control-side communication unit transmits the electronic ticket generated by the control-side ticket generation unit to the server according to the instruction from the doctor, the diagnosis-side communication unit receives the electronic ticket from the server according to the instruction from the patient, and the ticket acquisition unit acquires the electronic ticket received by the diagnosis-side communication unit.

In addition, it is preferable that a server that is connected to the ultrasound diagnostic apparatus and the external control apparatus via the network is provided, the server includes a server-side ticket generation unit that generates the electronic ticket according to an instruction from the doctor, the diagnosis-side communication unit receives the electronic ticket generated by the server-side ticket generation unit from the server according to the instruction from the patient, and the ticket acquisition unit acquires the electronic ticket received by the diagnosis-side communication unit.

In addition, it is preferable that the control-side communication unit transmits the electronic ticket generated by the control-side ticket generation unit to the ultrasound diagnostic apparatus according to the instruction from the patient, the diagnosis-side communication unit receives the electronic ticket transmitted from the external control apparatus, and the ticket acquisition unit acquires the electronic ticket received by the diagnosis-side communication unit.

In addition, it is preferable that the control-side communication unit transmits the electronic ticket generated by the control-side ticket generation unit to a cloud storage according to the instruction from the doctor, the diagnosis-side communication unit receives the electronic ticket from the cloud storage according to the instruction from the patient, and the ticket acquisition unit acquires the electronic ticket received by the diagnosis-side communication unit.

In addition, it is preferable that the ticket acquisition unit acquires the electronic ticket by reading information on the electronic ticket recorded in a two-dimensional code.

In addition, it is preferable that the ticket acquisition unit acquires the electronic ticket by reading information on the electronic ticket recorded on a medium that is mailed to the patient by the doctor.

In addition, it is preferable that the ticket acquisition unit confirms whether or not the electronic ticket is distributed in a case in which an application for ultrasound diagnosis is activated.

In addition, it is preferable that the ticket acquisition unit confirms whether or not the electronic ticket is distributed based on information on the electronic ticket included in a push notification.

In addition, it is preferable that the ticket acquisition unit confirms whether or not the electronic ticket is distributed based on a notification transmitted to a notification destination registered in advance.

In addition, it is preferable that the scanning control unit considers that the scanning is canceled in a case in which the scanning time is within a determined time.

In addition, according to the present invention, there is provided a control method of an ultrasound system in which an ultrasound diagnostic apparatus used by a patient and an external control apparatus used by a doctor are connected to each other via a network, the method comprising:

a step of acquiring an electronic ticket including information on an upper limit time for scanning an examination site using an ultrasound probe included in the ultrasound diagnostic apparatus via a ticket acquisition unit of a diagnostic apparatus main body in the ultrasound diagnostic apparatus; and a step of controlling a scanning time from start to end of the scanning to be limited to the upper limit time included in the electronic ticket via a scanning control unit of the diagnostic apparatus main body.

In the present invention, by using the electronic ticket, it is possible to control a scanning time and the like in a case in which the patient scans an examination site at home. As a result, according to the present invention, scanning of the examination site can be performed safely, and the health of the patient can be protected.

DESCRIPTION OF THE PREFERRED EMBODIMENTS

Hereinafter, an ultrasound system and a control method of the ultrasound system according to the present invention will be described in detail based on preferred embodiments illustrated in the accompanying drawings.

Figure 1:
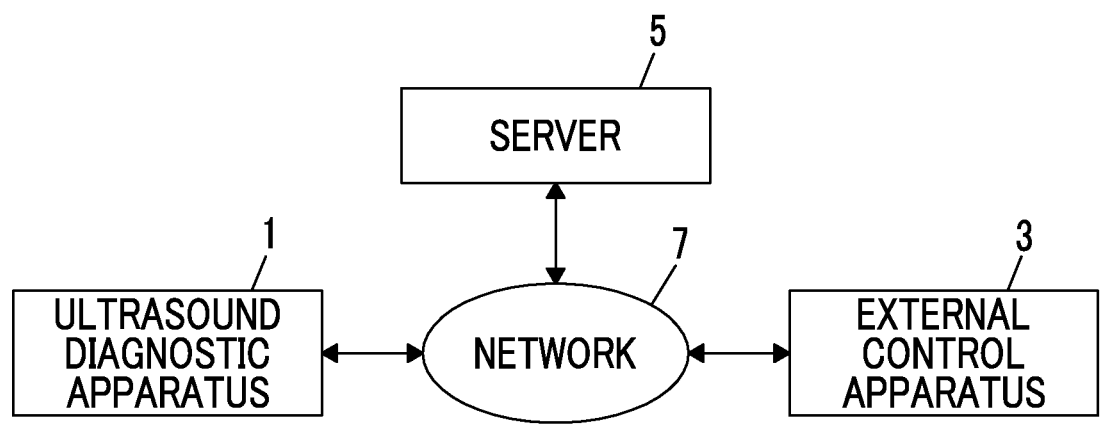
FIG. 1 is a block diagram of an embodiment illustrating a configuration of an ultrasound system of the present invention.

FIG. 1 is a block diagram of an embodiment illustrating a configuration of the ultrasound system of the present invention. The ultrasound system illustrated in FIG. 1 comprises an ultrasound diagnostic apparatus 1, and an external control apparatus 3 and a server 5 that are bidirectionally connected to the ultrasound diagnostic apparatus 1 via a network 7, respectively.

The ultrasound diagnostic apparatus 1 is used by a patient using the ultrasound diagnostic apparatus 1 to scan the patient's own examination site, who is a subject of the ultrasound diagnosis, at home or the like, and to transmit an ultrasound image generated from the signal obtained by the scanning to the external control apparatus 3.

On the other hand, the external control apparatus 3 is used by a doctor using the external control apparatus 3 to view the ultrasound image of the examination site of the patient transmitted from the ultrasound diagnostic apparatus 1 in a hospital or the like.

Although FIG. 1 illustrates only one ultrasound diagnostic apparatus 1, a plurality of ultrasound diagnostic apparatuses 1 used by a plurality of patients, respectively, may be provided. The same applies to the external control apparatus 3. For example, a plurality of external control apparatuses 3 used by a plurality of doctors working in a hospital may be provided.

Figure 2:
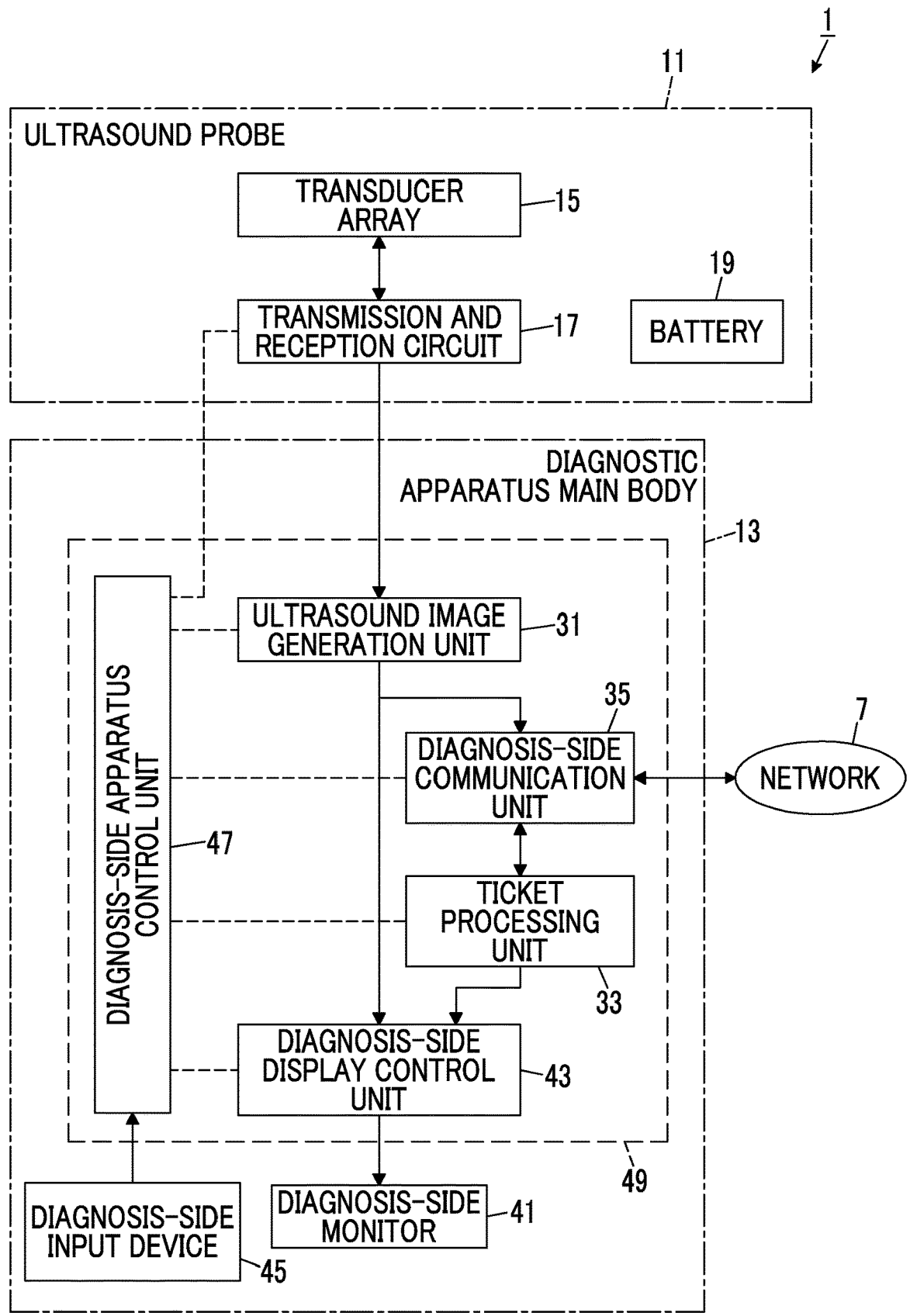
FIG. 2 is a block diagram of an embodiment illustrating a configuration of an ultrasound diagnostic apparatus.

As illustrated in FIG. 2, the ultrasound diagnostic apparatus 1 comprises an ultrasound probe 11 and a diagnostic apparatus main body 13 that is connected to the ultrasound probe 11. The ultrasound diagnostic apparatus 1 of the present embodiment is realized by the ultrasound probe 11, a handheld diagnostic apparatus main body 13, and an application for ultrasound diagnosis and an application for downloading an electronic ticket that operate on the diagnostic apparatus main body 13.

The ultrasound probe 11 scans the examination site of the patient using an ultrasound beam and outputs a sound ray signal corresponding to the ultrasound image of the examination site. As illustrated in FIG. 2, the ultrasound probe 11 comprises a transducer array 15, a transmission and reception circuit 17, and a battery 19. The transducer array 15 and the transmission and reception circuit 17 are bidirectionally connected, and a diagnosis-side apparatus control unit 47 of the diagnostic apparatus main body 13, which will be described below, is connected to the transmission and reception circuit 17.

The transducer array 15 has a plurality of ultrasound transducers arranged one-dimensionally or two-dimensionally. Each of these transducers transmits an ultrasound wave in accordance with a drive signal supplied from the transmission and reception circuit 17 and outputs an analog reception signal by receiving a reflected wave from the patient's body.

For example, each transducer is configured by using an element in which electrodes are formed at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 3:
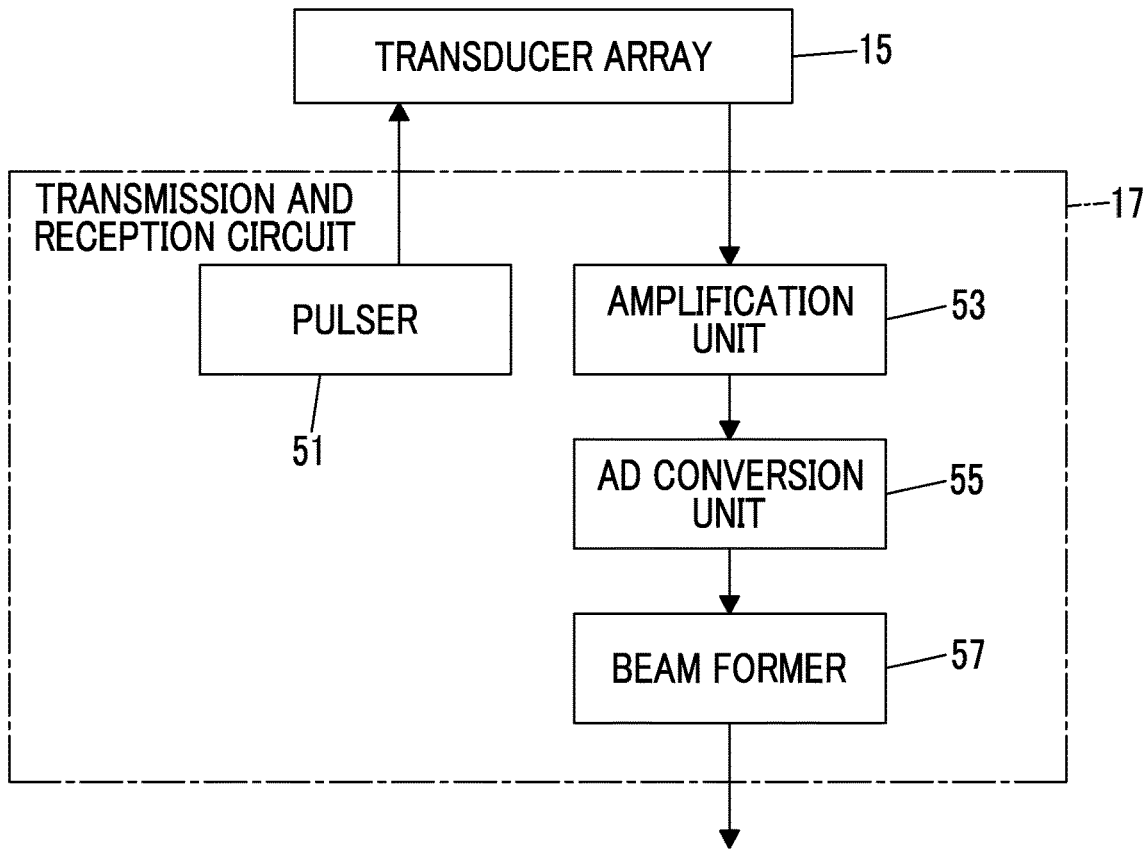
FIG. 3 is a block diagram of an embodiment illustrating a configuration of a transmission and reception circuit.

Under the control of the diagnosis-side apparatus control unit 47, the transmission and reception circuit 17 generates the sound ray signal by transmitting the ultrasound beam from the transducer array 15 and performing reception focus processing on the reception signal output from the transducer array 15, which has received an ultrasound echo. As illustrated in FIG. 3, the transmission and reception circuit 17 includes a pulser 51 connected to the transducer array 15, and an amplification unit 53, an analog digital (AD) conversion unit 55, and a beam former 57 that are sequentially connected in series from the transducer array 15.

The pulser 51 includes, for example, a plurality of pulse generators, and performs transmission focus processing of adjusting the amount of delay of each drive signal so that ultrasound wave transmitted from the plurality of transducers of the transducer array 15 form an ultrasound beam based on a transmission delay pattern selected by the diagnosis-side apparatus control unit 47 and supplying it to the plurality of transducers. In a case in which a pulsed or continuous-wave voltage is applied to the electrodes of the transducers of the transducer array 15 through the transmission focus processing, the piezoelectric body expands and contracts, and a pulsed or continuous-wave ultrasound wave is generated from each of the transducers, whereby the ultrasound beam is formed from a combined wave of these ultrasound waves.

The transmitted ultrasound beam is reflected in, for example, a target such as a site of the patient's body and propagates toward the transducer array 15 of the ultrasound probe 11. Each of the transducers constituting the transducer array 15 expands and contracts by receiving the ultrasound echo propagating toward the transducer array 15 in this manner, generates a reception signal, which is an electrical signal, and outputs the reception signal to the amplification unit 53.

The amplification unit 53 amplifies the signal input from each of the transducers constituting the transducer array 15 and transmits the amplified signal to the AD conversion unit 55. The AD conversion unit 55 converts the analog signal transmitted from the amplification unit 53 into digital reception data, and outputs the reception data to the beam former 57.

The beam former 57 performs reception focus processing in which addition is performed by giving delays to respective pieces of the reception data converted by the AD conversion unit 55 according to a sound speed distribution or a sound speed which is set based on the reception delay pattern selected by the diagnosis-side apparatus control unit 47. Through the reception focus processing, a sound ray signal in which each piece of the reception data converted by the AD conversion unit 55 is phased and added and the focus of the ultrasound echo is narrowed down is generated.

The battery 19 is built in the ultrasound probe 11, and supplies power to each circuit of the ultrasound probe 11.

The diagnostic apparatus main body 13 generates an ultrasound image of the examination site of the patient based on the signals obtained by the scan. The diagnostic apparatus main body 13 is, for example, a handheld terminal apparatus, such as a smartphone or a tablet personal computer (PC), and comprises an ultrasound image generation unit 31, a ticket processing unit 33, a diagnosis-side communication unit 35, a diagnosis-side monitor 41, a diagnosis-side display control unit 43, a diagnosis-side input device 45, and a diagnosis-side apparatus control unit 47, as illustrated in FIG. 2.

The ultrasound image generation unit 31 is connected to the transmission and reception circuit 17 of the ultrasound probe 11, and the diagnosis-side display control unit 43 and the diagnosis-side monitor 41 are sequentially connected to the ultrasound image generation unit 31. In addition, the diagnosis-side communication unit 35 is connected to the ultrasound image generation unit 31, and the diagnosis-side communication unit 35 is bidirectionally connected to the network 7. The diagnosis-side communication unit 35 is bidirectionally connected to the ticket processing unit 33, and the diagnosis-side display control unit 43 is connected to the ticket processing unit 33. The diagnosis-side apparatus control unit 47 is connected to the diagnosis-side input device 45, and the ultrasound image generation unit 31, the ticket processing unit 33, the diagnosis-side communication unit 35, and the diagnosis-side display control unit 43 are connected to the diagnosis-side apparatus control unit 47, respectively.

The ultrasound probe 11 and the diagnostic apparatus main body 13 are connected via wireless connection using wireless communication, such as wireless fidelity (Wi-Fi), or connected via wired connection using wired communication, such as a universal serial bus (USB) cable.

Figure 4:
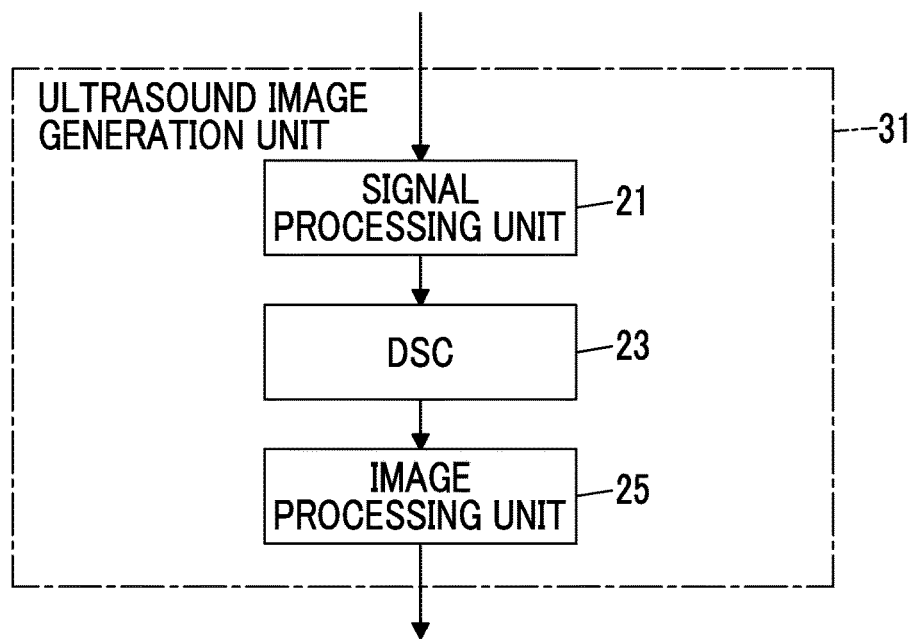
FIG. 4 is a block diagram of an embodiment illustrating a configuration of an ultrasound image generation unit.

Under the control of the diagnosis-side apparatus control unit 47, the ultrasound image generation unit 31 generates the ultrasound image (ultrasound image signal) of the examination site of the patient from the signal obtained by the scan, that is, the reception signal obtained by transmitting and receiving the ultrasound beam to and from the examination site of the patient using the ultrasound probe 11 (more precisely, the transducer array 15), more specifically, from the sound ray signal generated from the reception signal by the transmission and reception circuit 17. As illustrated in FIG. 4, the ultrasound image generation unit 31 has a configuration in which a signal processing unit 21, a DSC 23, and an image processing unit 25 are sequentially connected in series.

The signal processing unit 21 generates image information data corresponding to the ultrasound image based on the sound ray signal generated by the transmission and reception circuit 17. More specifically, the signal processing unit 21 performs signal processing on the sound ray signal generated by the beam former 57 of the transmission and reception circuit 17, for example, corrects the attenuation caused by a propagation distance according to the depth of a position where the ultrasound wave is reflected, and then performs envelope detection processing to generate the image information data representing tomographic image information regarding tissues inside the patient.

The digital scan converter (DSC) 23 raster-converts the image information data generated by the signal processing unit 21 into an image signal according to a scanning method of a normal television signal.

The image processing unit 25 performs various types of image processing such as brightness correction, gradation correction, sharpness correction, image size correction, refresh rate correction, scanning frequency correction, and color correction according to a display format of the diagnosis-side monitor 41 on the image signal input from the DSC 23 to generate the ultrasound image, and outputs the ultrasound image, which has been subjected to the image processing, to the diagnosis-side display control unit 43.

Figure 5:
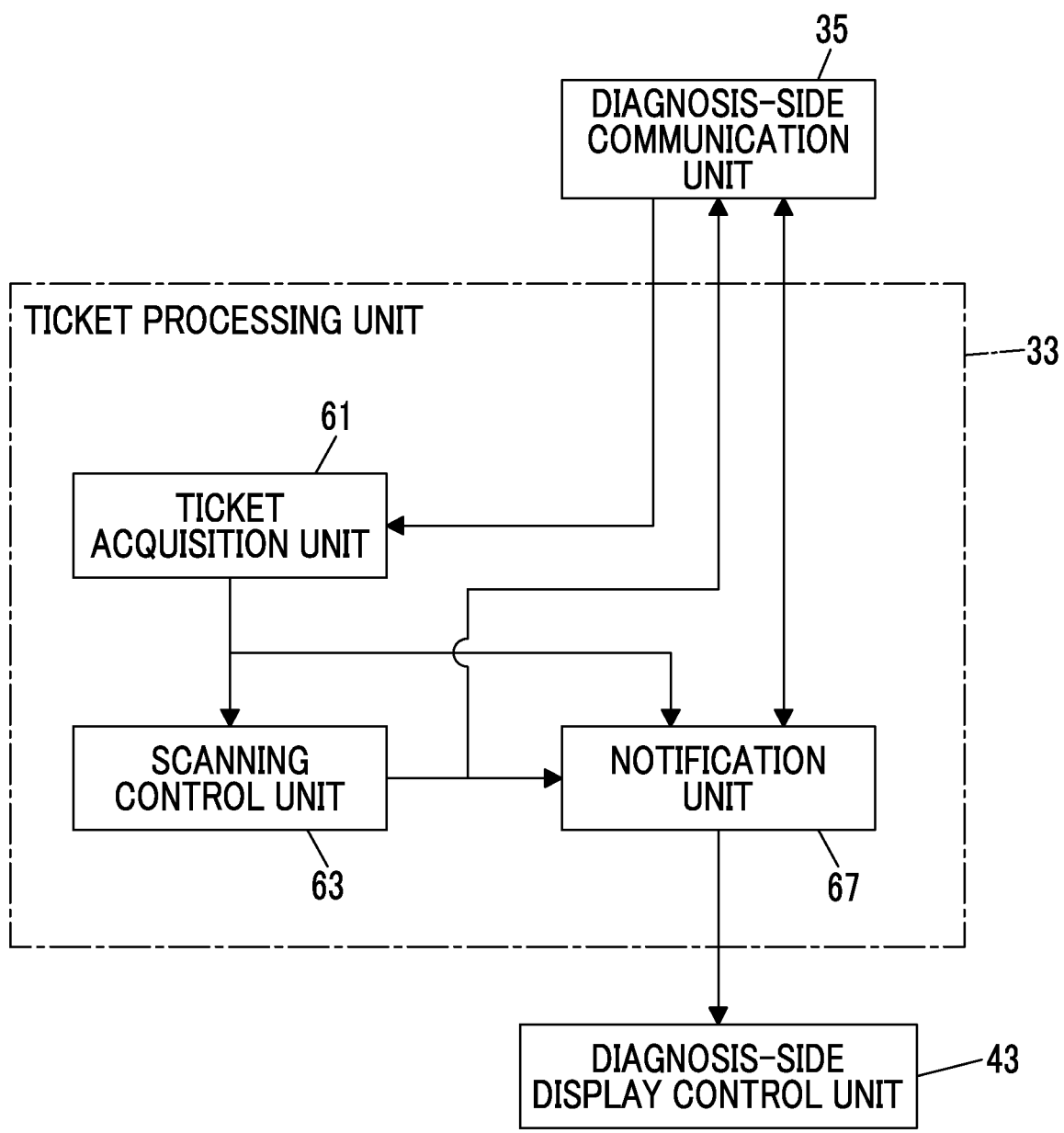
FIG. 5 is a block diagram of an embodiment illustrating a configuration of a ticket processing unit.

Under the control of the diagnosis-side apparatus control unit 47, the ticket processing unit 33 controls an implementation period in a case of performing scanning, a scanning time from a start to an end of scanning, and the like by using the electronic ticket, and performs various types of processing for transmitting the ultrasound image of the examination site of the patient to the external control apparatus 3. As illustrated in FIG. 5, the ticket processing unit 33 includes a ticket acquisition unit 61, a scanning control unit 63, and a notification unit 67.

The ticket acquisition unit 61 is connected to the diagnosis-side communication unit 35, and the scanning control unit 63 is connected to the ticket acquisition unit 61. The diagnosis-side communication unit 35 is connected to the scanning control unit 63. The notification unit 67 is bidirectionally connected to the diagnosis-side communication unit 35. In addition, the notification unit 67 is connected to each of the ticket acquisition unit 61 and the scanning control unit 63, and the diagnosis-side display control unit 43 is connected to the notification unit 67.

The ticket acquisition unit 61 acquires an electronic ticket necessary for the patient to scan an examination site.

The electronic ticket includes information, such as an expiration date of the electronic ticket and an upper limit time for scanning. The patient acquires the electronic ticket and scans the examination site by using the electronic ticket. In other words, the patient cannot perform the scanning in a case in which the patient does not have the electronic ticket. Then, in a case in which one scanning is ended, for example, one electronic ticket is consumed.

The scanning control unit 63 performs various types of control related to scanning.

The scanning control unit 63 performs control such that scanning can be started, for example, in a case in which a precondition for using the ultrasound diagnostic apparatus 1 is satisfied and the patient has an electronic ticket. The preconditions for using the ultrasound diagnostic apparatus 1 are not particularly limited, but include the following (1) to (3) and the like in the case of the present embodiment.

(1) The ultrasound probe 11 and the diagnostic apparatus main body 13 are connected to each other. Accordingly, it is possible to generate an ultrasound image by performing scanning by using the ultrasound probe 11.

(2) The diagnostic apparatus main body 13 is connected to the network 7. Accordingly, the electronic ticket can be received from the server 5 to the ultrasound diagnostic apparatus 1, and the ultrasound image can be transmitted from the ultrasound diagnostic apparatus 1 to the server 5.

(3) The scanning time from the start to the end of scanning based on the date and time information acquired from the network 7 is controlled, in other words, the setting of the date and time of the diagnostic apparatus main body 13 is automatically set based on the date and time information acquired from the network 7. Accordingly, it is possible to prevent the patient from changing the setting of the date and time of the diagnostic apparatus main body 13 and to prevent the scanning time from being tampered.

In addition, the scanning control unit 63 performs control such that scanning can be performed only during a period of an expiration date included in the electronic ticket. Furthermore, the scanning control unit 63 controls the scanning time to be limited to the upper limit time included in the electronic ticket.

The notification unit 67 notifies at least one of a patient or a doctor of various types of information.

For example, the notification unit 67 notifies the patient of an error message in at least one of a case in which the precondition is not satisfied or a case in which the patient does not have the electronic ticket.

The method of notification is not particularly limited, but for example, information such as an error message may be displayed on the diagnosis-side monitor 41, may be uttered from a speaker, which is not illustrated, or both may be performed simultaneously. In addition, in a case in which the notification unit 67 notifies the doctor of the information, the information is transmitted from the ultrasound diagnostic apparatus 1 to the external control apparatus 3.

Under the control of the diagnosis-side apparatus control unit 47, the diagnosis-side communication unit 35 transmits and receives various types of information between the ultrasound diagnostic apparatus 1 and each of the external control apparatus 3 and the server 5.

In the case of the present embodiment, the diagnosis-side communication unit 35 receives the electronic ticket from the server 5 and transmits the ultrasound image generated by the ultrasound image generation unit 31 to the server 5. The diagnosis-side communication unit 35 and the network 7 are connected by, for example, the Internet, a communication line, or the like.

Under the control of the diagnosis-side display control unit 43, the diagnosis-side monitor 41 displays various types of information. The diagnosis-side monitor 41 is not particularly limited, but examples thereof include a liquid crystal display (LCD) and an organic electro-luminescence (EL) display.

Under the control of the diagnosis-side apparatus control unit 47, the diagnosis-side display control unit 43 displays various types of information on the diagnosis-side monitor 41.

The diagnosis-side input device 45 receives various instructions input from the patient.

The diagnosis-side input device 45 is not particularly limited, but examples thereof include, for example, various buttons and a touch panel provided on a display screen of the diagnosis-side monitor 41, and inputting various instructions by a touch operation of the patient.

The diagnosis-side apparatus control unit 47 controls each unit of the ultrasound probe 11 and the diagnostic apparatus main body 13 according to a program stored in advance and an instruction from the patient which is input through the diagnosis-side input device 45.

In the case of the present embodiment, the ultrasound image generation unit 31, the ticket processing unit 33, the diagnosis-side communication unit 35, the diagnosis-side display control unit 43, and the diagnosis-side apparatus control unit 47 are configured by a diagnosis-side processor 49.

Figure 6:
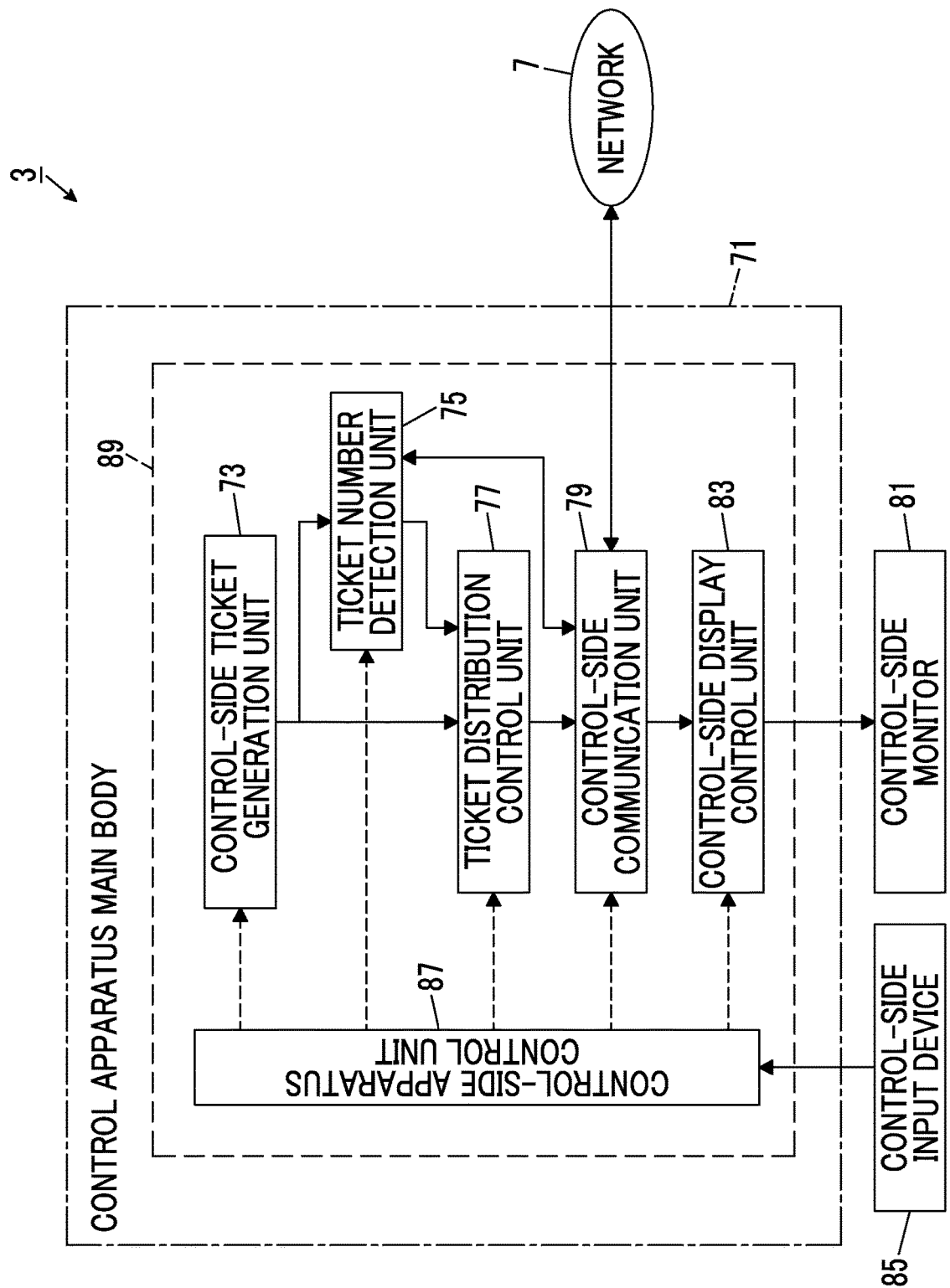
FIG. 6 is a block diagram of an embodiment illustrating a configuration of an external control apparatus.

Next, the external control apparatus 3 generates the electronic ticket and displays the ultrasound image of the patient. The external control apparatus 3 is, for example, a desktop-type PC, and comprises a control apparatus main body 71, a control-side monitor 81, and a control-side input device 85, as illustrated in FIG. 6. In addition, the control apparatus main body 71 comprises a control-side ticket generation unit 73, a ticket number detection unit 75, a ticket distribution control unit 77, a control-side communication unit 79, a control-side display control unit 83, and a control-side apparatus control unit 87.

The ticket distribution control unit 77, the control-side communication unit 79, the control-side display control unit 83, the control-side monitor 81 are sequentially connected to the control-side ticket generation unit 73. In addition, the ticket number detection unit 75 and the ticket distribution control unit 77 are sequentially connected to the control-side ticket generation unit 73. The ticket number detection unit 75 is bidirectionally connected to the control-side communication unit 79, and the control-side communication unit 79 is bidirectionally connected to the network 7. The control-side apparatus control unit 87 is connected to the control-side input device 85, and the control-side ticket generation unit 73, the ticket number detection unit 75, the ticket distribution control unit 77, the control-side communication unit 79, and the control-side display control unit 83 are connected to the control-side apparatus control unit 87, respectively.

Under the control of the control-side apparatus control unit 87, the control-side ticket generation unit 73 generates an electronic ticket according to an instruction from the doctor.

Under the control of a control-side apparatus control unit 87, the ticket number detection unit 75 detects the number of electronic tickets held by the patient at regular intervals, such as once a day, or at determined timings. For example, in a case in which the electronic tickets are generated by the control-side ticket generation unit 73, the ticket number detection unit 75 adds the number of electronic tickets based on the information on the number of generated electronic tickets generated by the control-side ticket generation unit 73. On the other hand, in a case in which the electronic tickets are consumed by the scanning control unit 63, the information on the number of consumed electronic tickets consumed by the scanning control unit 63 is transmitted from the ultrasound diagnostic apparatus 1 to the external control apparatus 3. In response to this, the ticket number detection unit 75 subtracts the number of electronic tickets, for example, based on the information on the number of consumed electronic tickets transmitted from the ultrasound diagnostic apparatus 1 to the external control apparatus 3.

In the case of the present embodiment, the control apparatus main body 71 comprises the ticket number detection unit 75, but the present invention is not limited thereto, and the diagnostic apparatus main body 13 may comprise the ticket number detection unit 75. In this case, for example, in a case in which the electronic tickets are acquired by the ticket acquisition unit 61, the ticket number detection unit 75 adds the number of electronic tickets based on the information on the number of acquired electronic tickets acquired by the ticket acquisition unit 61. On the other hand, for example, in a case in which the electronic tickets are consumed by the scanning control unit 63, the ticket number detection unit 75 subtracts the number of electronic tickets based on the information on the number of consumed electronic tickets consumed by the scanning control unit 63. The information on the number of electronic tickets detected by the ticket number detection unit 75 is transmitted from the ultrasound diagnostic apparatus 1 to the external control apparatus 3.

Under the control of the control-side apparatus control unit 87, the ticket distribution control unit 77 controls whether or not to distribute the electronic ticket from the external control apparatus 3 to the ultrasound diagnostic apparatus 1 according to the information on the number of electronic tickets detected by the ticket number detection unit 75.

The ticket distribution control unit 77 performs control to distribute the electronic ticket in a case in which, for example, the patient does not have the determined number of tickets, for example, the upper limit of two electronic tickets, in other words, the patient does not have the electronic ticket or has only one electronic ticket. In addition, the ticket distribution control unit 77 controls not to distribute the electronic ticket in a case in which the patient has the determined number of electronic tickets.

Under the control of the control-side apparatus control unit 87, the control-side communication unit 79 transmits and receives various types of information between the external control apparatus 3 and each of the ultrasound diagnostic apparatus 1 and the server 5.

The control-side communication unit 79 transmits, for example, the electronic ticket generated by the control-side ticket generation unit 73 to the server 5, and receives the ultrasound image from the server 5. The control-side communication unit 79 and the network 7 are connected by, for example, the Internet, the communication line, or the like.

Under the control of the control-side display control unit 83, the control-side monitor 81 displays various types of information. The control-side monitor 81 is not particularly limited, but examples thereof include an LCD and an organic EL display.

Under the control of the control-side apparatus control unit 87, the control-side display control unit 83 displays various types of information on the control-side monitor 81.

The control-side input device 85 receives various instructions input from the doctor. The control-side input device 85 is not particularly limited, but examples thereof include, for example, a keyboard and a mouse.

The control-side apparatus control unit 87 controls each unit of the control apparatus main body 71 according to a program stored in advance and an instruction from the doctor input from the control-side input device 85.

In the case of the present embodiment, the control-side ticket generation unit 73, the ticket number detection unit 75, the ticket distribution control unit 77, the control-side communication unit 79, the control-side display control unit 83, and the control-side apparatus control unit 87 are configured by the control-side processor 89.

Figure 7:
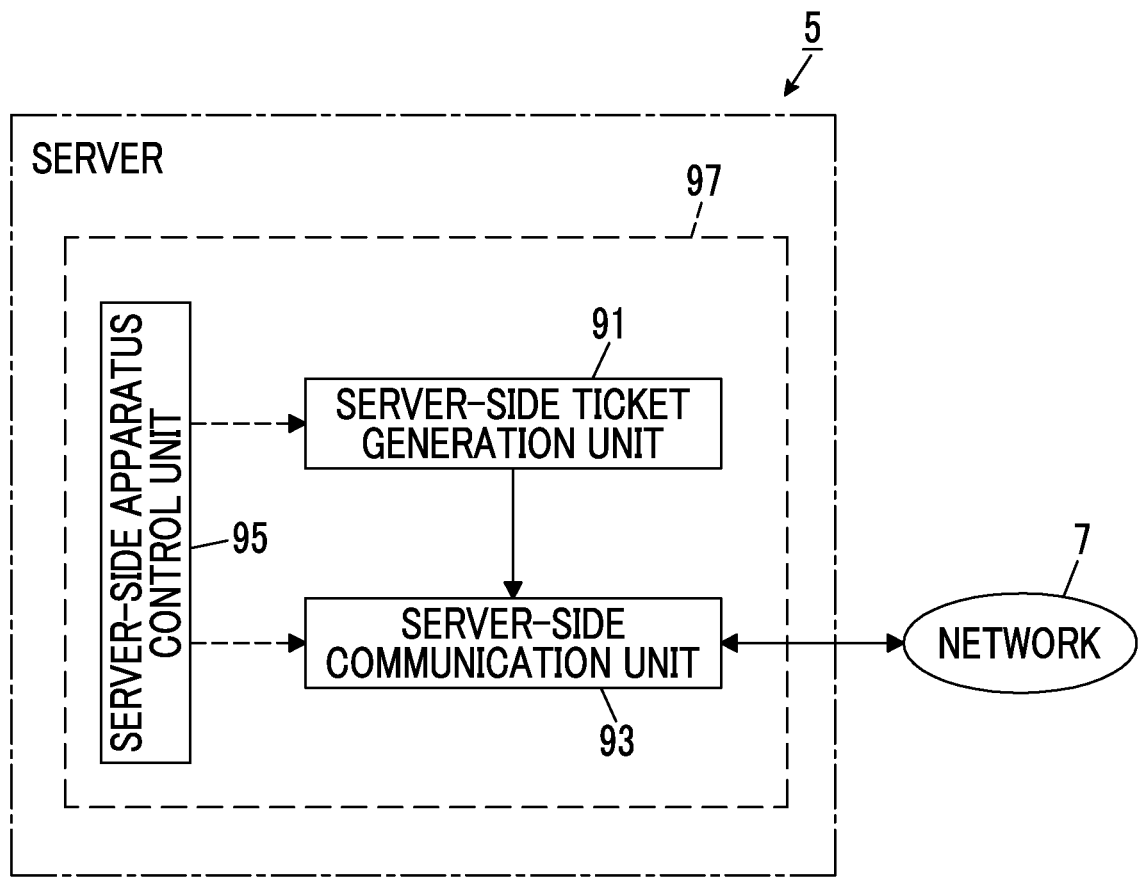
FIG. 7 is a block diagram of an embodiment illustrating a configuration of a server.

The server 5 mediates between the ultrasound diagnostic apparatus 1 and the external control apparatus 3 in a case in which the electronic ticket, the ultrasound image, and the like are transmitted and received. The server 5 is, for example, a workstation, and comprises a server-side ticket generation unit 91, a server-side communication unit 93, and a server-side apparatus control unit 95, as illustrated in FIG. 7.

The server-side communication unit 93 is connected to the server-side ticket generation unit 91, and the server-side communication unit 93 is bidirectionally connected to the network 7. Each of the server-side ticket generation unit 91 and the server-side communication unit 93 is connected to the server-side apparatus control unit 95.

Under the control of the server-side apparatus control unit 95, the server-side ticket generation unit 91 generates an electronic ticket according to an instruction from the doctor. In the present embodiment, it is not essential that the server 5 comprises the server-side ticket generation unit 91.

Under the control of the server-side apparatus control unit 95, the server-side communication unit 93 transmits and receives various types of information between the server 5 and each of the ultrasound diagnostic apparatus 1 and the external control apparatus 3.

In the case of the present embodiment, the server-side communication unit 93 receives the electronic ticket from the external control apparatus 3 and transmits the electronic ticket to the ultrasound diagnostic apparatus 1. In addition, the server-side communication unit 93 receives the ultrasound image from the ultrasound diagnostic apparatus 1 and transmits the ultrasound image to the external control apparatus 3. The server-side communication unit 93 and the network 7 are connected by, for example, the Internet, the communication line, or the like.

The server-side apparatus control unit 95 controls each unit of the server 5 according to a program stored in advance and an instruction from the patient and the doctor.

In the case of the present embodiment, the server-side ticket generation unit 91, the server-side communication unit 93, and the server-side apparatus control unit 95 are configured by a server-side processor 97.

Figure 8:
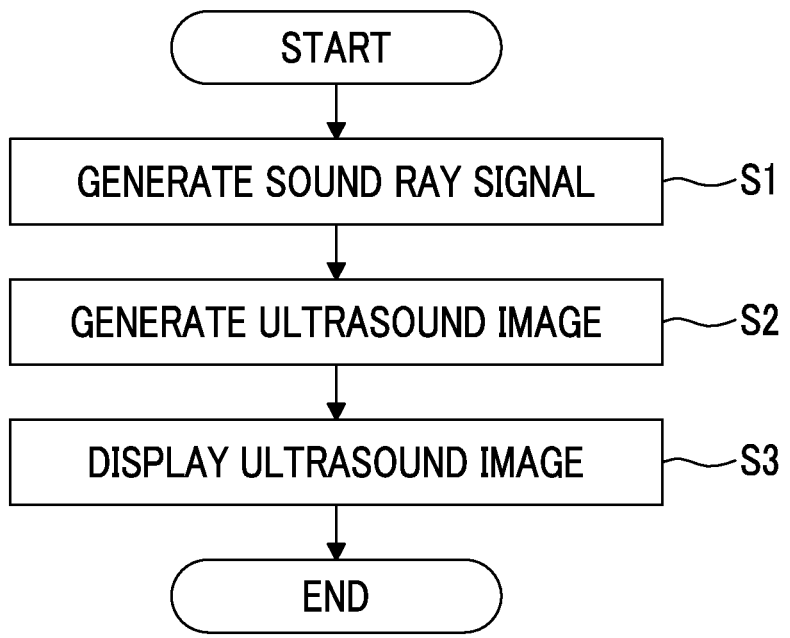
FIG. 8 is a flowchart of an embodiment illustrating an operation of the ultrasound diagnostic apparatus in a case of generating an ultrasound image.

Next, the operation of the ultrasound diagnostic apparatus 1 in a case of generating the ultrasound image will be described with reference to a flowchart of FIG. 8.

In a case of generating the ultrasound image, first, the transmission of the ultrasound waves is started by the transmission and reception circuit 17 in a state where the ultrasound probe 11 is in contact with the examination site of the patient, and the sound ray signal is generated (Step S1).

That is, the ultrasound beams are transmitted to the examination site of the patient from the plurality of transducers of the transducer array 15 in accordance with the drive signal from the pulser 51.

Ultrasound echoes from the examination site based on the ultrasound beams transmitted from the pulser 51 are received by each transducer of the transducer array 15, and the reception signal as an analog signal is output from each transducer of the transducer array 15, which has received the ultrasound echo.

The reception signal output from each transducer of the transducer array 15 is amplified by the amplification unit 53, and is subjected to AD conversion by the AD conversion unit 55, and thereby the reception data is acquired.

By performing the reception focus processing on the reception data by the beam former 57, the sound ray signal is generated.

Subsequently, the ultrasound image of the examination site of the patient is generated by the ultrasound image generation unit 31 based on the sound ray signal generated by the beam former 57 of the transmission and reception circuit 17 (Step S2).

That is, the sound ray signal generated by the beam former 57 is subjected to various types of signal processing by the signal processing unit 21, and the image information data representing tomographic image information regarding tissues inside the patient is generated.

The image information data generated by the signal processing unit 21 is raster-converted by the DSC 23, and is further subjected to various types of image processing by the image processing unit 25, and thus the ultrasound image is generated.

Subsequently, the diagnosis-side display control unit 43 performs predetermined processing on the ultrasound image generated by the image processing unit 25, and displays the ultrasound image on the diagnosis-side monitor 41 (Step S3).

Figure 9:
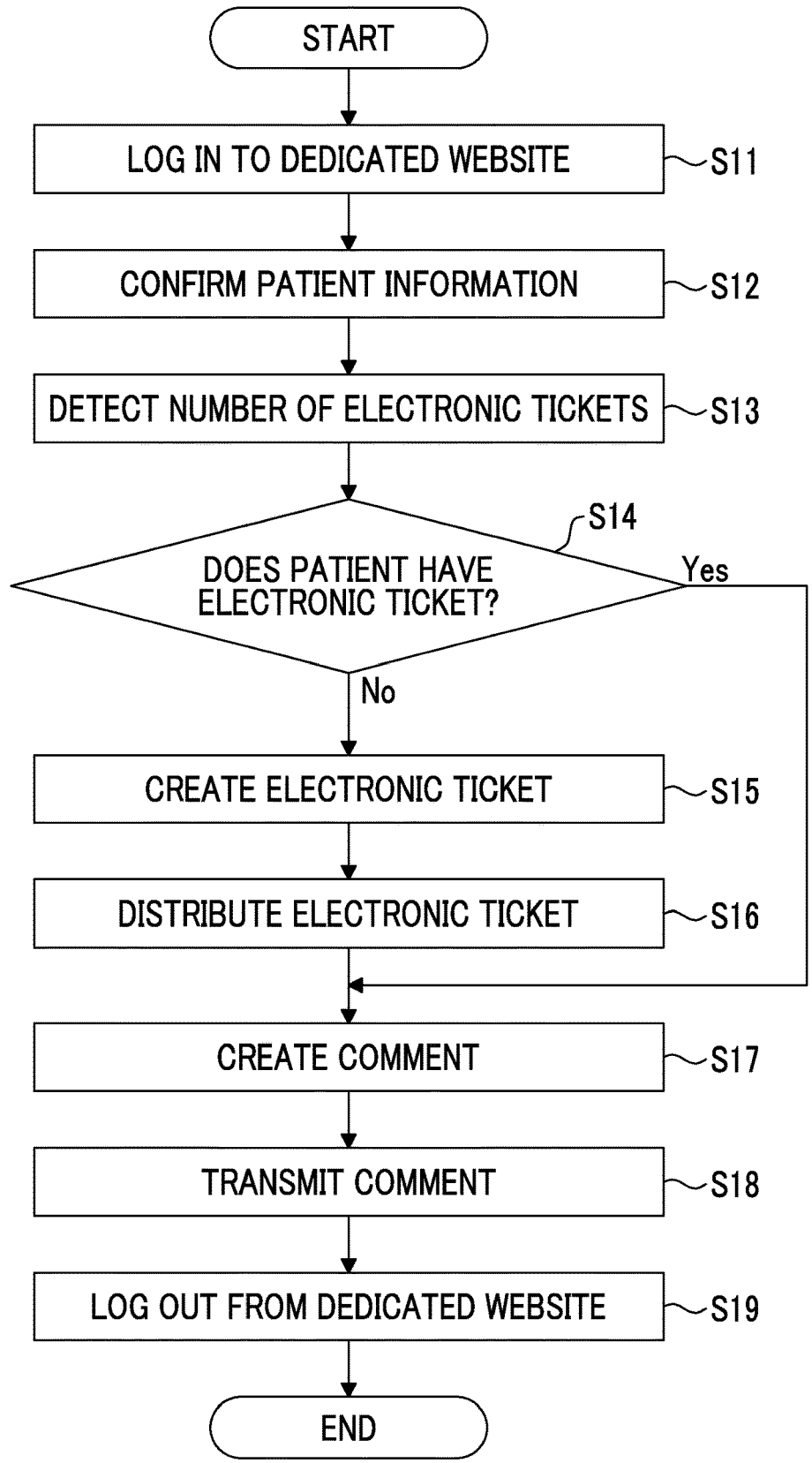
FIG. 9 is a flowchart of an embodiment illustrating an operation of the ultrasound system in a case in which a doctor creates an electronic ticket.

Next, the operation of the ultrasound system in a case in which a doctor creates an electronic ticket will be described with reference to a flowchart illustrated in FIG. 9.

First, the doctor logs in to a dedicated website on the server 5 for using the ultrasound system, in the external control apparatus 3 (Step S11). Accordingly, the doctor can use the ultrasound system.

Instead of logging in to a dedicated website, the doctor may log in to an application for ultrasound diagnosis that operates on the control apparatus main body 71 of the external control apparatus 3. Accordingly, the doctor can similarly use the ultrasound system.

Subsequently, the doctor confirms the patient information (Step S12).

In this case, a list of the patient information is displayed on the control-side monitor 81 by the control-side display control unit 83 according to an instruction from the doctor. The patient information includes information on an ID (identifier), a name, an age, and a stage of a medical condition of the patient, information on the number of electronic tickets held by the patient, and the like. The patient information may be stored on the server 5, or may be stored in the application for ultrasound diagnosis.

The doctor selects patient information of one patient from the list of the patient information displayed on the control-side monitor 81.

In response to this, the patient information of one patient selected by the doctor is displayed on the control-side monitor 81 by the control-side display control unit 83.

Subsequently, the number of electronic tickets held by the patient is detected by the ticket number detection unit 75, for example, based on the information on the number of electronic tickets included in the patient information (Step S13).

Subsequently, based on the information on the number of electronic tickets detected by the ticket number detection unit 75, the ticket distribution control unit 77 determines, for example, whether or not the patient has the electronic ticket (Step S14).

The doctor may determine whether or not the patient has the electronic ticket based on the information on the number of electronic tickets included in the patient information, and input the determination result to the ticket distribution control unit 77.

As a result, in a case in which it is determined that the patient has the electronic ticket (Yes in the step), and in a case in which the electronic ticket is further distributed, the ticket distribution control unit 77 performs control such that the electronic ticket is not distributed from the external control apparatus 3, because there is a risk that the patient may be exposed to more ultrasound than necessary by scanning using the plurality of electronic tickets continuously, which may lead to health hazards for the patient. After that, the processing proceeds to Step S17.

Even in a case in which it is determined that the patient has the electronic ticket, the doctor may create the electronic ticket in advance and distribute the electronic ticket created in advance after consuming the patient's existing electronic ticket.

On the other hand, in a case in which it is determined that the patient does not have the electronic ticket (No in the step), the doctor creates the electronic ticket (Step S15).

In this case, the control-side ticket generation unit 73 generates the electronic ticket according to an instruction from the doctor.

Here, in a case in which the symptoms of the patient progress along a plurality of stages, the control-side ticket generation unit 73 can set a default value of the upper limit time for each stage. For example, in a case in which the symptoms of the patient in a stepwise progression are follicle-counting stage, uterus observation stage in early pregnancy, and fetus observation stage in middle and late pregnancy in the patient's pregnancy, the default values of the upper limit time for follicle-counting, uterus observation, and fetus observation are set to, for example, 30 minutes, 5 minutes, and 15 minutes.

The control-side ticket generation unit 73 can change the default value of the upper limit time according to an instruction from the doctor. The doctor may change the default value of the upper limit time one by one, or the doctor may create a plurality of patterns in advance to change the default value of the upper limit time according to the patient and the symptoms of the patient in a stepwise progression, and the doctor may select and apply one pattern from among the plurality of patterns.

Subsequently, the doctor distributes the electronic ticket (Step S16).

In this case, the ticket distribution control unit 77 performs control such that the electronic ticket is distributed from the external control apparatus 3 according to an instruction from the doctor.

In response to this, in the case of the present embodiment, the control-side communication unit 79 transmits the electronic ticket generated by the control-side ticket generation unit 73 to the server 5.

In a case in which the doctor distributes the electronic ticket to the patient, the ticket distribution control unit 77 may determine whether or not the patient has a plurality of electronic tickets which are an upper limit. In this case, in a case in which it is determined that the patient has the plurality of electronic tickets, which are the upper limit, the ticket distribution control unit 77 performs control such that the electronic tickets are not distributed, and in a case in which it is determined that the patient does not have the plurality of electronic tickets, which are the upper limit, the ticket distribution control unit 77 performs control such that the electronic tickets are distributed.

Subsequently, the doctor creates a comment for the patient (Step S17).

The comment for the patient is not particularly limited, but examples thereof can include "Please perform scanning within 2-3 days." in a case of sending the electronic ticket to the patient, "Please perform scanning as soon as possible" in a case in which there are unused electronic tickets remaining, or "It's been a while, let's schedule a visit" in a case in which a predetermined period of time has passed since the last visit.

Subsequently, the doctor transmits the comment to the patient (Step S18).

In this case, the comment of the doctor is transmitted from the external control apparatus 3 to the server 5 by the control-side communication unit 79 according to an instruction from the doctor, and the comment of the doctor is received from the server 5 to the ultrasound diagnostic apparatus 1 by the diagnosis-side communication unit 35 according to an instruction from the patient. Accordingly, the patient can view the comment from the doctor.

Finally, the doctor logs out from the dedicated website (Step S19).

Figure 10:
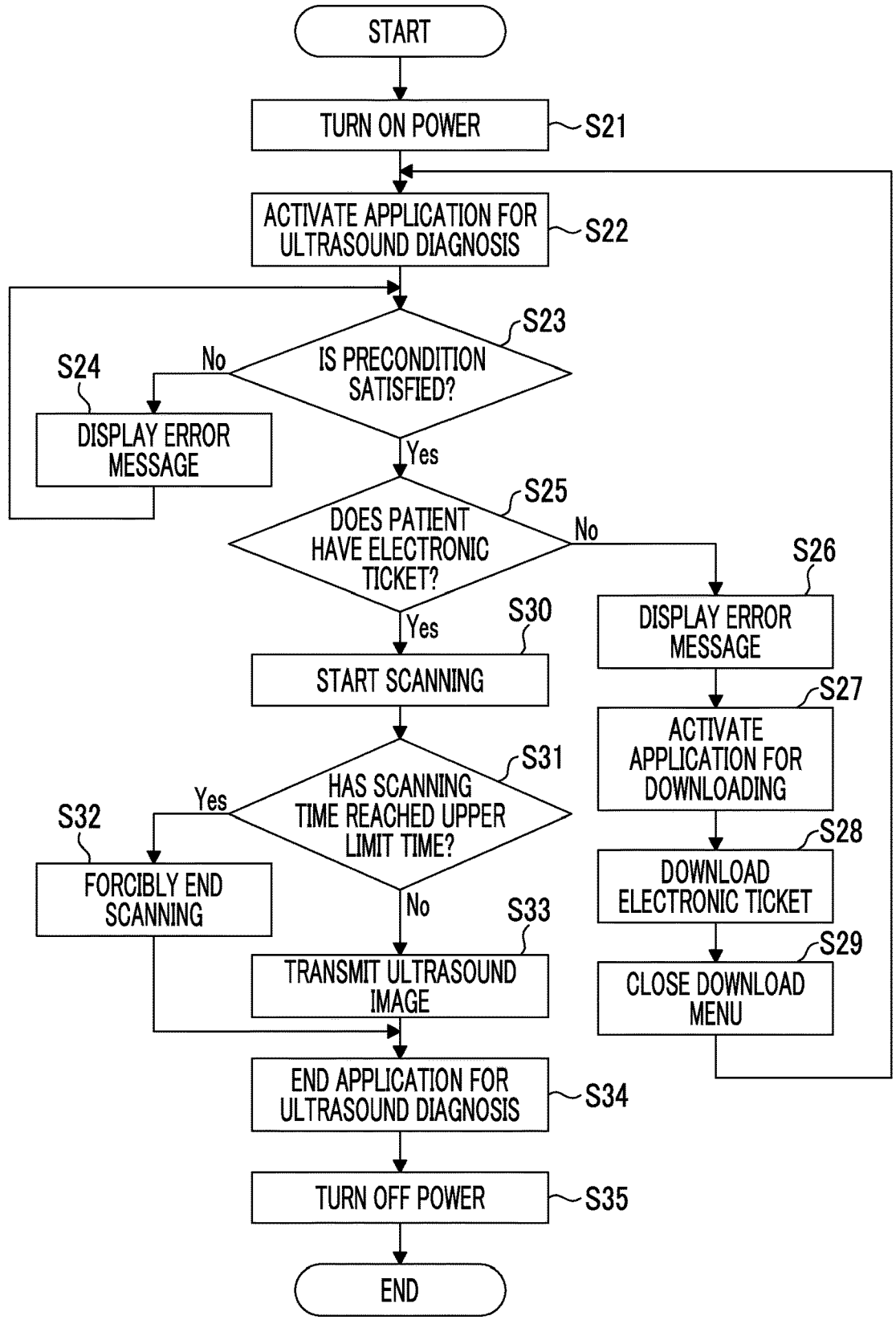
FIG. 10 is a flowchart of an embodiment illustrating an operation of the ultrasound system in a case in which a patient performs a scan.

Next, the operation of the ultrasound system in a case in which the patient performs the scanning will be described with reference to a flowchart illustrated in FIG. 10.

At home or the like, the patient turns on the power of the ultrasound diagnostic apparatus 1, that is, the power of the ultrasound probe 11 and the diagnostic apparatus main body 13 (Step S21).

In response to this, the diagnosis-side display control unit 43 displays a main menu screen (home menu screen) including a plurality of icons corresponding to a plurality of applications installed in the diagnostic apparatus main body 13 on the diagnosis-side monitor 41. In the case of the present embodiment, icons of various applications including an icon of the application for ultrasound diagnosis, an icon of the application for downloading the electronic ticket, and the like are displayed on the main menu screen.

Subsequently, the patient activates the application for ultrasound diagnosis by tapping the icon of the application for ultrasound diagnosis displayed on the diagnosis-side monitor 41 (Step S22).

Figure 12:
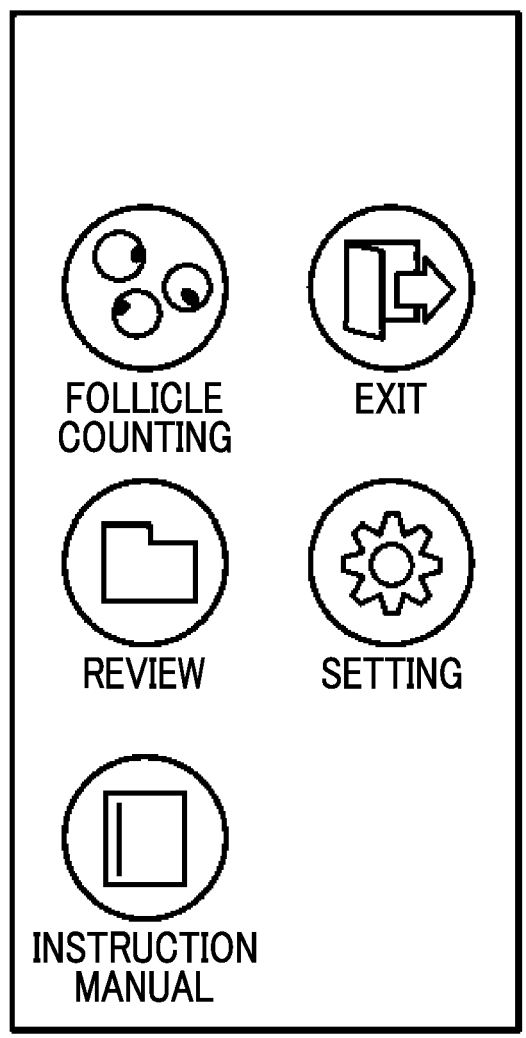
FIG. 12 is a conceptual diagram of another embodiment illustrating a menu screen of an application for ultrasound diagnosis.

In a case in which the application for ultrasound diagnosis is activated, the diagnosis-side display control unit 43 displays a menu screen including the plurality of icons corresponding to the plurality of functions of the application for ultrasound diagnosis on the diagnosis-side monitor 41. On the menu screen of the application for ultrasound diagnosis, in the case of the present embodiment, a plurality of icons of active states corresponding to a plurality of functions such as follicle counting, review, instruction manual, exit, and setting are displayed as illustrated in FIG. 12.

Subsequently, the scanning control unit 63 determines whether or not the precondition for using the ultrasound diagnostic apparatus 1 is satisfied (Step S23).

Figure 14:
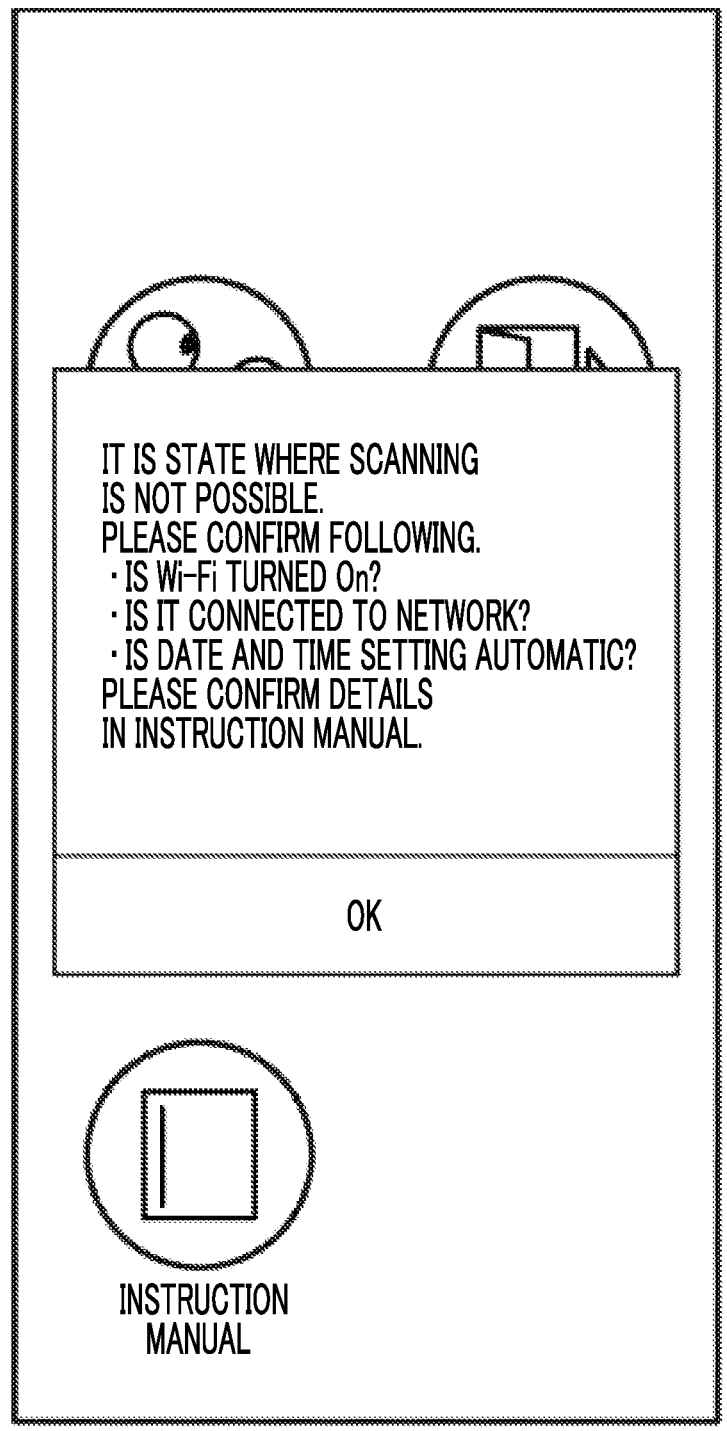
FIG. 14 is a conceptual diagram of an embodiment illustrating a display window of an error message.

As a result, in a case in which it is determined that the precondition is not satisfied (No in Step S23), as illustrated in FIG. 14, a display window of an error message for notifying the patient that the scanning is not possible because the precondition for using the ultrasound diagnostic apparatus 1 is not satisfied is superimposed and displayed on the menu screen by the notification unit 67 (Step S24).

Figure 13:
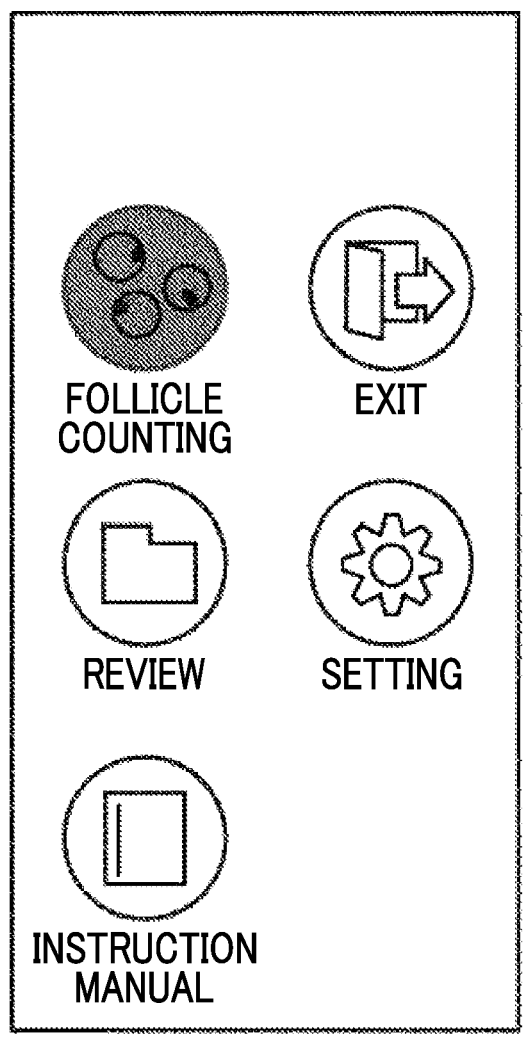
FIG. 13 is a conceptual diagram of still another embodiment illustrating a menu screen of an application for ultrasound diagnosis.

Subsequently, in a case in which the patient taps the "OK" button in the display window of the error message, the diagnosis-side display control unit 43 erases the display of the display window of the error message as illustrated in FIG. 13, and switches the icon corresponding to the scanning function, or in the case of the present embodiment, the follicle-counting icon, from the active state to the inactive state. Therefore, in this case, the patient cannot perform the scan. After that, the processing returns to Step S23.

Icons other than the icons corresponding to the scanning function, for example, icons corresponding to functions such as review, instruction manual, exit, and setting remain active, and the patient can have these active icons perform the corresponding functions.

On the other hand, in a case in which it is determined that the precondition is satisfied (Yes in Step S23), the scanning control unit 63 determines whether or not the patient has the electronic ticket (Step S25).

Figure 15:
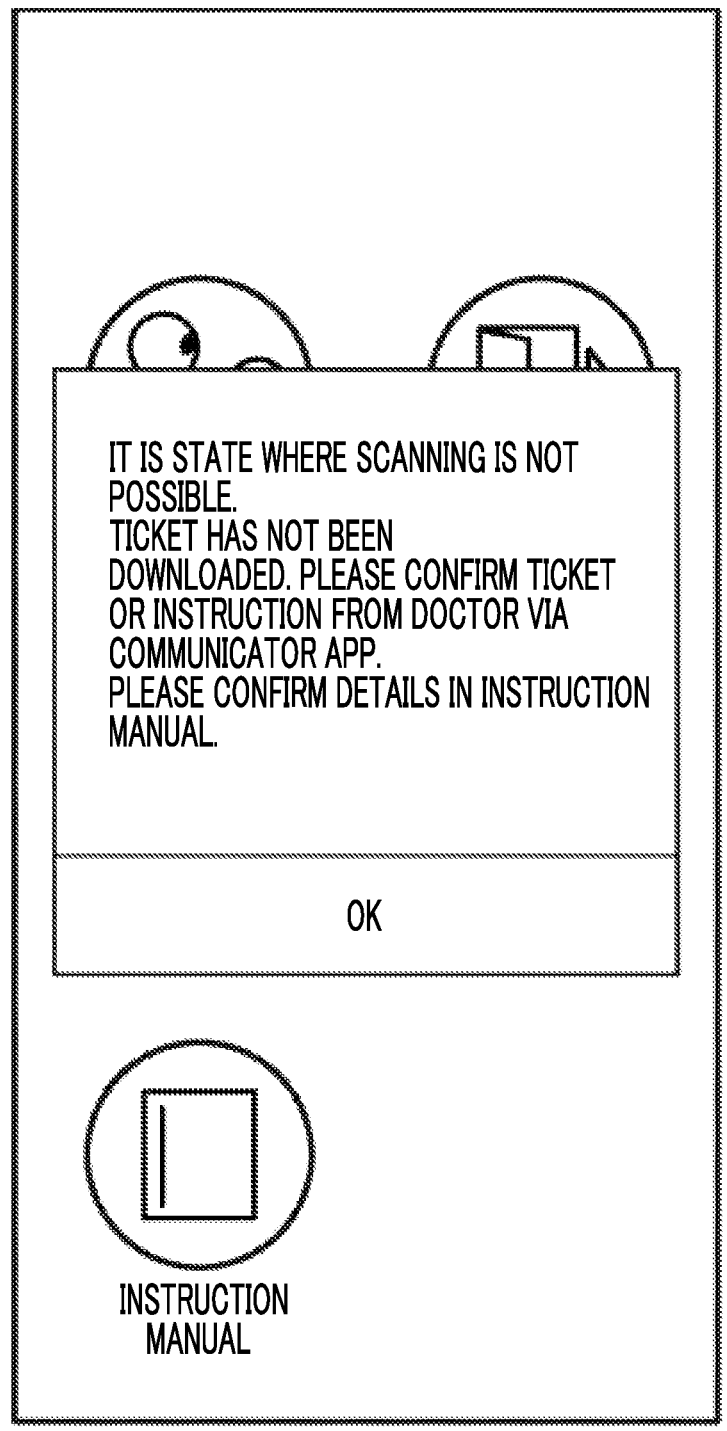
FIG. 15 is a conceptual diagram of another embodiment illustrating a display window of an error message.

As a result, in a case in which it is determined that the patient does not have the electronic ticket (No in Step S25), as illustrated in FIG. 15, a display window of an error message for notifying the patient that the scanning is not possible because the patient does not have the electronic ticket is superimposed and displayed on the menu screen by the notification unit 67 (Step S26).

Subsequently, in a case in which the patient taps the "OK" button in the display window of the error message, similarly, the diagnosis-side display control unit 43 erases the display of the display window of the error message as illustrated in FIG. 13, and switches the follicle-counting icon from the active state to the inactive state. Therefore, in this case as well, the patient cannot perform the scan, but can cause other functions corresponding to the icons in the active state to be performed.

As described above, in at least one of a case in which the precondition is not satisfied or a case in which the patient does not have the electronic ticket, the icon corresponding to the scanning function is switched from the active state to the inactive state by the diagnosis-side display control unit 43.

In a case in which the patient taps an icon in an inactive state to select it, a display window of an error message such as "Unable to confirm scannable conditions" and "Please exit the application once and confirm for any setting errors or the presence or absence of ticket" is superimposed and displayed on the menu screen by the notification unit 67.

Subsequently, the patient activates the application for downloading the electronic ticket by, for example, returning to the main menu screen and tapping the icon of the application for downloading (Step S27).

In a case in which the application for downloading is activated, a download menu of the application for downloading is displayed on the diagnosis-side monitor 41 by the diagnosis-side display control unit 43. In the download menu, in the case of the present embodiment, in a case in which the electronic ticket has been transmitted from the external control apparatus 3 to the server 5 according to the instruction from the doctor, the list of the transmitted electronic ticket is displayed.

Subsequently, the patient downloads the electronic ticket displayed on the download menu (Step S28).

In this case, the electronic ticket is transmitted to the ultrasound diagnostic apparatus 1 by the server-side communication unit 93 according to an instruction from the patient, and the electronic ticket transmitted from the server 5 is received by the diagnosis-side communication unit 35.

The electronic ticket received by the diagnosis-side communication unit 35 is acquired (downloaded) by the ticket acquisition unit 61.

Subsequently, the patient closes, for example, the download menu (Step S29), returns to the main menu screen, and activates the application for ultrasound diagnosis (Step S22). The following operations are as described above.

In the case of the present embodiment, an application for downloading the electronic ticket different from the application for ultrasound diagnosis is used. Accordingly, for example, in a case in which the application for ultrasound diagnosis is frequently updated and the application for downloading the electronic ticket is hardly updated, only the application for ultrasound diagnosis may be updated, and the download capacity of the application for updating and the update time can be saved.

An application for downloading an electronic ticket may be included as one of the functions of the application for ultrasound diagnosis. Accordingly, it is not necessary to switch the applications.

Figure 11:
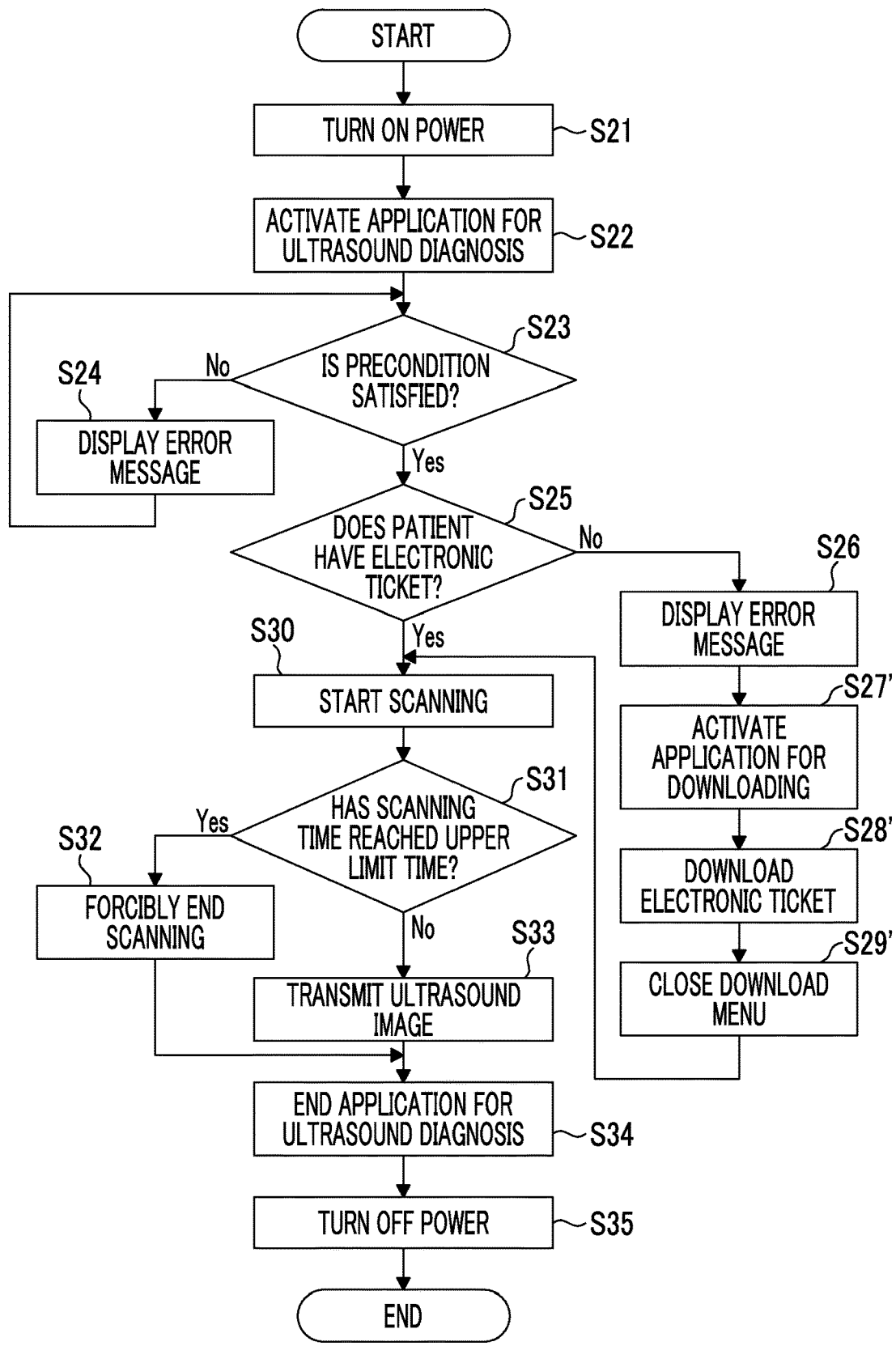
FIG. 11 is a flowchart of another embodiment illustrating an operation of an ultrasound system in a case in which a patient performs a scan.

In this case, as illustrated in a flowchart of FIG. 11, the patient performs the function of downloading the electronic ticket by tapping an icon corresponding to the function of downloading the electronic ticket, which is not illustrated, on a menu screen (Step S27'). In a case in which the download function is performed, the diagnosis-side display control unit 43 displays a download menu of the download function on the diagnosis-side monitor 41.

Subsequently, the patient downloads the electronic ticket displayed on the download menu (Step S28'). In a case in which the patient closes the download menu (Step S29'), the processing proceeds to Step S30.

On the other hand, in a case in which it is determined that the patient has the electronic ticket (Yes in Step S25), the patient activates the follicle-counting function by tapping the follicle-counting icon, for example, on the menu screen of the application for ultrasound diagnosis, and starts scanning with the ultrasound probe 11 in contact with the patient's own examination site, for example, the abdomen (Step S30).

In response to this, the ultrasound image generation unit 31 generates the ultrasound image of the examination site of the patient from the signals obtained by the scan.

Here, in a case in which the scanning time is within the determined time, for example, within 10 seconds after the start of the scan, the scanning control unit 63 considers that the scanning has been canceled. In this case, the electronic ticket is not consumed. Accordingly, this can help even if the patient accidentally taps the icon corresponding to the function of scanning to start the scan, in particular, in a case of scanning for the first time or after a long time.

After starting the scanning, the scanning control unit 63 determines whether or not the scanning time has reached the upper limit time included in the electronic ticket (Step S31).

As a result, in a case in which the scanning time has reached the upper limit time included in the electronic ticket without generating an appropriate ultrasound image (Yes in Step S31), the scanning is forcibly ended by the scanning control unit 63 (Step S32), and one electronic ticket is consumed.

The appropriate ultrasound image is an image that is suitable for use by a doctor in diagnosis among images obtained by the follicle counting while the scanning time reaches the upper limit time of the follicle counting. The appropriate ultrasound image may be determined, for example, by determining whether or not the ultrasound image is a blurred image due to camera shake or the like, by determining the degree of matching with the previous ultrasound image of the same examination site, or may be determined by the patient pressing a freeze button or a save button.

In this case, the diagnosis-side display control unit 43 displays the menu screen of the application for ultrasound diagnosis on the diagnosis-side monitor 41, and switches the icon of follicle counting from the active state to the inactive state, as illustrated in FIG. 13. In addition, the notification unit 67 notifies the patient and the doctor that the scanning has been forcibly ended. Accordingly, the patient and the doctor can know that the scanning may not have ended normally. After that, the processing proceeds to Step S34.

On the other hand, in a case in which the appropriate ultrasound image is generated while the scanning time reaches the upper limit time included in the electronic ticket (Yes in Step S31), in the case of the present embodiment, the diagnosis-side communication unit 35 transmits the ultrasound image generated by the ultrasound image generation unit 31 to the server 5 according to an instruction from the patient (Step S33). In a case in which the transmission of the ultrasound image is ended, for example, one electronic ticket is consumed.

Subsequently, the patient ends the application for ultrasound diagnosis (Step S34) and turns off the power of the ultrasound diagnostic apparatus 1 (Step S35).

On the other hand, the doctor receives the ultrasound image of the examination site of the patient from the patient, in a hospital or the like.

In this case, in the external control apparatus 3, the ultrasound image is transmitted to the external control apparatus 3 by the server-side communication unit 93 according to an instruction from the doctor, and the ultrasound image transmitted from the server 5 is received by the control-side communication unit 79.

Then, the ultrasound image received by the control-side communication unit 79 is displayed on the control-side monitor 81 by the control-side display control unit 83.

The doctor can view the ultrasound image of the examination site of the patient displayed on the control-side monitor 81 and can perform the diagnosis or the like.

As described above, in the case of the present embodiment, the electronic ticket is transmitted from the external control apparatus 3 to the ultrasound diagnostic apparatus 1 via the server 5. That is, the electronic ticket generated by the control-side ticket generation unit 73 is transmitted to the server 5 by the control-side communication unit 79 according to an instruction from the doctor, and the electronic ticket is received from the server 5 by the diagnosis-side communication unit 35 according to an instruction from the patient. The electronic ticket received by the diagnosis-side communication unit 35 is acquired by the ticket acquisition unit 61.

On the other hand, the ultrasound image is transmitted from the ultrasound diagnostic apparatus 1 to the external control apparatus via the server 5. That is, the ultrasound image is transmitted to the server 5 by the diagnosis-side communication unit 35 according to an instruction from the patient, and the ultrasound image is received from the server 5 by the control-side communication unit 79 according to an instruction from the doctor.

In the ultrasound system, by using the electronic ticket, it is possible to control a scanning time and the like in a case in which the patient scans an examination site at home. As described above, in a case in which the patient can freely perform scanning at home with the patient's own determination without receiving a direct instruction from a doctor, there is a risk that the ultrasound is applied to the patient at an unnecessary time, which may lead to health hazards for the patient. On the other hand, by controlling the scanning time, scanning of the examination site can be performed safely, and the health of the patient can be protected.

The ultrasound system does not necessarily comprise the server 5.

In this case, the electronic ticket is directly transmitted from the external control apparatus 3 to the ultrasound diagnostic apparatus 1. For example, the electronic ticket is transmitted to the ultrasound diagnostic apparatus 1 by the control-side communication unit 79 according to an instruction from the doctor, and the electronic ticket transmitted from the external control apparatus 3 is received by the diagnosis-side communication unit 35. The electronic ticket received by the diagnosis-side communication unit 35 is acquired by the ticket acquisition unit 61.

In addition, the ultrasound image is directly transmitted from the ultrasound diagnostic apparatus 1 to the external control apparatus. For example, the ultrasound image is transmitted to the external control apparatus 3 by the diagnosis-side communication unit 35 according to an instruction from the patient, and the ultrasound image transmitted from the ultrasound diagnostic apparatus 1 is received by the control-side communication unit 79.

The method of distributing and acquiring the electronic ticket is not limited to the above embodiment.

For example, the electronic ticket may be generated in the server 5 and distributed to the patient according to an instruction from the doctor.

In this case, the electronic ticket is generated by the server-side ticket generation unit 91 according to an instruction from the doctor, and the electronic ticket generated by the server-side ticket generation unit 91 is received from the server 5 to the ultrasound diagnostic apparatus 1 by the diagnosis-side communication unit 35 according to an instruction from the patient. The electronic ticket received by the diagnosis-side communication unit 35 is acquired by the ticket acquisition unit 61.

The patient may acquire the electronic ticket from the external control apparatus 3 by a remote operation.

In this case, the electronic ticket generated by the control-side ticket generation unit 73 is transmitted from the external control apparatus 3 to the ultrasound diagnostic apparatus 1 by the control-side communication unit 79 according to an instruction from the patient using the remote operation, and the electronic ticket transmitted from the external control apparatus 3 is received to the ultrasound diagnostic apparatus 1 by the diagnosis-side communication unit 35. The electronic ticket received by the diagnosis-side communication unit 35 is acquired by the ticket acquisition unit 61.

Furthermore, a cloud storage (online storage) may be used to transmit and receive the electronic ticket between the ultrasound diagnostic apparatus 1 and the external control apparatus 3.

In this case, the electronic ticket generated by the control-side ticket generation unit 73 is transmitted from the external control apparatus 3 to the cloud storage by the control-side communication unit 79 according to an instruction from the doctor, and the electronic ticket is received from the cloud storage to the ultrasound diagnostic apparatus 1 by the diagnosis-side communication unit 35 according to an instruction from the patient. The electronic ticket received by the diagnosis-side communication unit 35 is acquired by the ticket acquisition unit 61.

Alternatively, the ticket acquisition unit 61 may acquire the electronic ticket by reading the information on the electronic ticket recorded in a two-dimensional code such as a quick response (QR) code transmitted from the external control apparatus 3 or the server 5.

In addition, the ticket acquisition unit 61 may acquire the electronic ticket by reading the information on the electronic ticket recorded on a medium that is mailed to the patient by the doctor.

The medium for recording the information on the electronic ticket is not particularly limited, but may be, for example, a semiconductor memory such as a USB memory and an SD memory card, or a card on which a two-dimensional code is printed. In addition, the method of reading information on the electronic ticket from the medium is not particularly limited. For example, the information on the electronic ticket can be read from the medium using near field communication (NFC).

Timing for confirming whether or not the electronic ticket is distributed is not particularly limited, but for example, the ticket acquisition unit 61 can confirm whether or not the electronic ticket is distributed in a case of activating the application for ultrasound diagnosis.

In addition, the method of confirming whether or not the electronic ticket is distributed is not particularly limited. For example, in a case in which distribution of the electronic ticket is instructed by the doctor, a push notification indicating that the electronic ticket is distributed is transmitted from the external control apparatus 3 to the ultrasound diagnostic apparatus 1. Accordingly, the ticket acquisition unit 61 can confirm whether or not the electronic ticket is distributed based on the information on the electronic ticket included in the push notification.

Alternatively, the ticket acquisition unit 61 may confirm whether or not the electronic ticket is distributed based on a notification transmitted to a previously registered notification destination, such as an e-mail address and a Social Networking Service (SNS) account.

The diagnostic apparatus main body 13 may comprise the ultrasound image generation unit 31, but the present invention is not limited to this, and all of the ultrasound image generation unit 31 or only the signal processing unit 21 may be provided on an ultrasound probe 11 side.

In the apparatus of the embodiment of the present invention, as the hardware configuration of the processing unit that executes various types of processing, such as the transmission and reception circuit 17, the ultrasound image generation unit 31, the ticket processing unit 33, the diagnosis-side display control unit 43, and the diagnosis-side apparatus control unit 47, dedicated hardware may be used, or various processors or computers that execute programs may be used.

The various processors include a central processing unit (CPU), which is a general-purpose processor that executes software (program) and functions as the various processing units, a programmable logic device (PLD), which is a processor whose circuit configuration can be changed after manufacture, such as a field programmable gate array (FPGA), and a dedicated electric circuit, which is a processor having a circuit configuration that is designed for exclusive use in order to execute specific processing, such as an application specific integrated circuit (ASIC).

One processing unit may be configured by using one of the various processors or may be configured by using a combination of two or more processors of the same type or different types, for example, a combination of a plurality of FPGAs or a combination of an FPGA and a CPU. In addition, a plurality of processing units may be configured by using one of various processors, or two or more of the plurality of processing units may be collectively configured by using one processor.

For example, first, as represented by a computer, such as a client and a server, there is a form in which one processor is configured by using a combination of one or more CPUs and software and this processor functions as the plurality of processing units. In addition, as represented by a system on chip (SoC) or the like, there is a form in which the processor is used in which the functions of the entire system which includes the plurality of processing units are implemented by a single integrated circuit (IC) chip.

Furthermore, the hardware configuration of these various processors is, more specifically, an electric circuit (circuitry) in which circuit elements, such as semiconductor elements, are combined.

In addition, the method according to the embodiment of the present invention can be implemented, for example, by a program for causing a computer to execute each of the steps thereof. In addition, a computer-readable recording medium on which the program is recorded can be provided.

Although the present invention has been described in detail above, the present invention is not limited to the embodiment described above, and it is needless to say that various improvements or changes may be made without departing from the gist of the present invention.

EXPLANATION OF REFERENCES

1: ultrasound diagnostic apparatus
3: external control apparatus
5: server
7: network
11: ultrasound probe
13: diagnostic apparatus main body
15: transducer array
17: transmission and reception circuit
19: battery
21: signal processing unit
23: DSC
25: image processing unit
31: ultrasound image generation unit
33: ticket processing unit
35: diagnosis-side communication unit
41: diagnosis-side monitor
43: diagnosis-side display control unit
45: diagnosis-side input device
47: diagnosis-side apparatus control unit
49: diagnosis-side processor
51: pulser
53: amplification unit
55: AD conversion unit
57: beam former
61: ticket acquisition unit
63: scanning control unit
67: notification unit
71: control apparatus main body
73: control-side ticket generation unit
75: ticket number detection unit
77: ticket distribution control unit
79: control-side communication unit
81: control-side monitor
83: control-side display control unit
85: control-side input device
87: control-side apparatus control unit
89: control-side processor
91: server-side ticket generation unit
93: server-side communication unit
95: server-side apparatus control unit
97: server-side processor

What is claimed is:

1. An ultrasound system in which an ultrasound diagnostic apparatus used by a patient and an external control apparatus used by a doctor are connected to each other via a network,
wherein the ultrasound diagnostic apparatus includes an ultrasound probe and a diagnostic apparatus main body, and
the diagnostic apparatus main body includes a first processor, wherein the first processor is configured to
acquire an electronic ticket including information on an upper limit time for scanning an examination site using the ultrasound probe, and
control a scanning time from start to end of the scanning to be limited to the upper limit time included in the electronic ticket, and
the external control apparatus includes a control apparatus main body, and
the control apparatus main body includes a second processor, wherein the second processor is configured to
detect the number of the electronic tickets held by the patient, and
control whether or not to distribute the electronic ticket from the external control apparatus based on information on the number of the electronic tickets.

2. The ultrasound system according to claim 1,
wherein the first processor is configured to
generate an ultrasound image from a signal obtained by the scanning, and
transmit the ultrasound image from the ultrasound diagnostic apparatus to the external control apparatus according to an instruction from the patient,
the external control apparatus includes a control-side monitor, and
the second processor is configured to
receive the ultrasound image transmitted from the ultrasound diagnostic apparatus, and
display the ultrasound image received by the second processor on the control-side monitor.

3. The ultrasound system according to claim 1,
wherein the first processor performs control such that the scanning is capable of being started in a case in which a precondition is satisfied that the ultrasound probe and the diagnostic apparatus main body are connected, the diagnostic apparatus main body is connected to the network, and the scanning time is controlled based on date and time information acquired from the network, and the patient has the electronic ticket, and
the first processor is configured to notify the patient of an error message in at least one of a case in which the precondition is not satisfied or a case in which the patient does not have the electronic ticket.

4. The ultrasound system according to claim 3,
wherein the diagnostic apparatus main body includes a diagnosis-side monitor,
wherein the first processor is configured to display a menu screen including a plurality of icons corresponding to a plurality of functions included in an application for ultrasound diagnosis on the diagnosis-side monitor, and switch the icon corresponding to a function of the scanning from an active state to an inactive state in at least one of the case in which the precondition is not satisfied or the case in which the patient does not have the electronic ticket.

5. The ultrasound system according to claim 4,
wherein the first processor notifies the patient of an error message in a case in which the patient selects the icon corresponding to the function of the scanning in the inactive state.

6. The ultrasound system according to claim 3,
wherein the first processor forcibly ends the scanning in a case in which the scanning time reaches the upper limit time, and
in a case in which the scanning is forcibly ended, the first processor notifies the doctor that the scanning has been forcibly ended.

7. The ultrasound system according to claim 2,
wherein the second processor is configured to generate the electronic ticket according to an instruction from the doctor.

8. The ultrasound system according to claim 7,
wherein, in a case in which symptoms of the patient progress along a plurality of stages, the second processor sets a default value of the upper limit time for each stage.

9. The ultrasound system according to claim 8,
wherein the second processor changes the default value of the upper limit time according to the instruction from the doctor.

10. The ultrasound system according to claim 7,
wherein a server that is connected to the ultrasound diagnostic apparatus and the external control apparatus via the network is provided,
the second processor transmits the electronic ticket generated by the second processor to the server according to the instruction from the doctor,
the first processor receives the electronic ticket from the server according to the instruction from the patient, and
the first processor acquires the electronic ticket received by the first processor.

11. The ultrasound system according to claim 2,
wherein a server that is connected to the ultrasound diagnostic apparatus and the external control apparatus via the network is provided,
the server includes a third processor, wherein the third processor is configured to generate the electronic ticket according to an instruction from the doctor,
the first processor receives the electronic ticket generated by the third processor from the server according to the instruction from the patient, and
the first processor acquires the electronic ticket received by the first processor.

12. The ultrasound system according to claim 7,
wherein the second processor transmits the electronic ticket generated by the second processor to the ultrasound diagnostic apparatus according to the instruction from the patient,
the first processor receives the electronic ticket transmitted from the external control apparatus, and
the first processor acquires the electronic ticket received by the first processor.

13. The ultrasound system according to claim 7,
wherein the second processor transmits the electronic ticket generated by the second processor to a cloud storage according to the instruction from the doctor,
the first processor receives the electronic ticket from the cloud storage according to the instruction from the patient, and
the first processor acquires the electronic ticket received by the first processor.

14. The ultrasound system according to claim 1,
wherein the first processor acquires the electronic ticket by reading information on the electronic ticket recorded in a two-dimensional code.

15. The ultrasound system according to claim 7,
wherein the first processor acquires the electronic ticket by reading information on the electronic ticket recorded on a medium that is mailed to the patient by the doctor.

16. The ultrasound system according to claim 1,
wherein the first processor confirms whether or not the electronic ticket is distributed in a case in which an application for ultrasound diagnosis is activated.

17. The ultrasound system according to claim 1,
wherein the first processor confirms whether or not the electronic ticket is distributed based on information on the electronic ticket included in a push notification.

18. The ultrasound system according to claim 1,
wherein the first processor confirms whether or not the electronic ticket is distributed based on a notification transmitted to a notification destination registered in advance.

19. The ultrasound system according to claim 1,
wherein the first processor considers that the scanning is canceled in a case in which the scanning time is within a determined time.

20. A control method of an ultrasound system in which an ultrasound diagnostic apparatus used by a patient and an external control apparatus used by a doctor are connected to each other via a network, the method comprising:
acquiring an electronic ticket including information on an upper limit time for scanning an examination site using an ultrasound probe included in the ultrasound diagnostic apparatus via a first processor of a diagnostic apparatus main body in the ultrasound diagnostic apparatus;
controlling a scanning time from start to end of the scanning to be limited to the upper limit time included in the electronic ticket via the first processor of the diagnostic apparatus main body;
detecting the number of the electronic tickets held by the patient via a second processor of a control apparatus main body of the external control apparatus; and
controlling whether or not to distribute the electronic ticket from the external control apparatus based on information on the number of the electronic tickets via the second processor.

* * * * *